US010521227B2

(12) United States Patent
Langhammer

(10) Patent No.: US 10,521,227 B2
(45) Date of Patent: *Dec. 31, 2019

(54) DISTRIBUTED DOUBLE-PRECISION FLOATING-POINT ADDITION

(71) Applicant: Intel Corporation, Santa Clara, CA (US)

(72) Inventor: Martin Langhammer, Salisbury (GB)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/042,910

(22) Filed: Jul. 23, 2018

(65) Prior Publication Data

US 2018/0329706 A1 Nov. 15, 2018

Related U.S. Application Data

(63) Continuation of application No. 15/367,205, filed on Dec. 2, 2016, now Pat. No. 10,031,752.

(51) Int. Cl.
*G06F 7/485* (2006.01)
*G06F 9/30* (2018.01)
*G06F 7/38* (2006.01)

(52) U.S. Cl.
CPC ............ *G06F 9/30014* (2013.01); *G06F 7/38* (2013.01); *G06F 7/485* (2013.01)

(58) Field of Classification Search
CPC .................................. G06F 7/483; G06F 7/485
See application file for complete search history.

(56) References Cited

U.S. PATENT DOCUMENTS

| 8,463,835 | B1 | 6/2013 | Walke |
| 9,098,332 | B1 | 8/2015 | Langhammer |
| 9,189,200 | B1 | 11/2015 | Langhammer |
| 9,317,478 | B2* | 4/2016 | Swartzlander, Jr. ..... G06F 7/485 |
| 9,645,792 | B2 | 5/2017 | Argade et al. |
| 10,007,487 | B1* | 6/2018 | Czajkowski ............ G06F 5/012 |
| 10,061,579 | B1* | 8/2018 | Langhammer ........ G06F 9/3001 |

(Continued)

OTHER PUBLICATIONS

S. Ghosh, P. Bhattacharyya, and A. Dutta, "FPGA Based Implementation of a Double Precision IEEE Floating-Point Adder", In Proceedings of the 7th International Conference on Intelligent Systems and Control (ISCO), pp. 271-275, 2013.

*Primary Examiner* — Chuong D Ngo
(74) *Attorney, Agent, or Firm* — Fletcher Yoder PC

(57) ABSTRACT

The present embodiments relate to circuitry that efficiently performs double-precision floating-point addition operations, single-precision floating-point addition operations, and fixed-point addition operations. Such circuitry may be implemented in specialized processing blocks. If desired, each specialized processing block may efficiently perform a single-precision floating-point addition operation, and multiple specialized processing blocks may be coupled together to perform a double-precision floating-point addition operation. In some embodiments, four specialized processing blocks that are arranged in a one-way cascade chain may compute the sum of two double-precision floating-point number. If desired, two specialized processing blocks that are arranged in a two-way cascade chain may compute the sum of two double-precision floating-point numbers.

18 Claims, 13 Drawing Sheets

(56) References Cited

U.S. PATENT DOCUMENTS

2008/0133895 A1 6/2008 Sivtsov et al.
2013/0007075 A1 1/2013 Oliver et al.
2015/0067010 A1 3/2015 Czajkowski et al.

* cited by examiner

DISTRIBUTED DOUBLE-PRECISION FLOATING-POINT ADDITION

CROSS REFERENCE TO RELATED APPLICATIONS

This is a continuation of U.S. patent application Ser. No. 15/367,405 filed Dec. 2, 2016, entitled "DISTRIBUTED DOUBLE-PRECISION FLOATING-POINT ADDITION," the entirety of which is herein incorporated by reference for all purposes.

BACKGROUND

The present embodiments relate to integrated circuits and, more particularly, to performing double-precision floating-point addition operations using specialized processing blocks in an integrated circuit.

As applications increase in complexity, it has become more common to include specialized processing blocks in integrated circuits. Such specialized processing blocks may be partly or fully hardwired to perform one or more specific tasks, such as a logical or a mathematical operation. A specialized processing block may also contain one or more specialized structures, such as an array of configurable memory elements.

Examples of structures that are commonly implemented in such specialized processing blocks include: multipliers, adders, accumulators, arithmetic logic units (ALUs), barrel-shifters, various memory elements or storage circuits such as first-in first-out (FIFO) circuits, last-in first-out (LIFO) circuits, serial-in parallel-out (SIPO) shift register circuits, parallel-in serial-out (PISO) shift register circuits, random-access memory (RAM) circuits, read-only memory (ROM) circuits, content-addressable memory (CAM) circuits and register files, logic AND, logic NAND, logic OR, logic NOR arrays, etc., or combinations thereof.

One particularly useful type of specialized processing block, which is sometimes also referred to as a digital signal processing (DSP) block, may be used to process digital signals such as video signals, audio signals, etc. Such blocks are frequently also referred to as multiply-accumulate (MAC) blocks, because they include structures to perform multiplication operations, and sums and/or accumulations of multiplication operations.

Integrated circuits such as programmable integrated circuits sold by Altera Corporation, of San Jose, Calif., as part of the STRATIX® and ARRIA® families include specialized processing blocks, each of which includes a plurality of multipliers. Each of those specialized processing blocks also includes adders and registers, as well as programmable connectors (e.g., multiplexers) that allow the various components of the block to be configured in different ways.

Typically, the arithmetic operators (adders and multipliers) in such specialized processing blocks have been fixed-point operators. If floating-point operators were needed, they would be construct outside the specialized processing block using general-purpose programmable logic of the device, or using a combination of the fixed-point operators inside the specialized processing block with additional logic in the general-purpose programmable logic.

SUMMARY

Circuitry that performs a double-precision floating-point addition of a first double-precision floating-point number having a first mantissa and a first exponent and a second double-precision floating-point number having a second mantissa and a second exponent, whereby the first mantissa is partitioned into first most significant bits (MSBs) and first least significant bits (LSBs) and the second mantissa is partitioned into second most significant bits (MSBs) and second least significant bits (LSBs), may include first and second specialized processing blocks. The first specialized processing block may receive the first and second MSBs and the first and second exponents and generate a first control signal based on a first comparison of the first exponent with the second exponent and a second comparison of the first MSBs with the second MSBs.

The second specialized processing block may be arranged in a cascade chain downstream from the first specialized processing block and receive the first control signal from the first specialized processing block, the first and second LSBs, and the first and second exponents and generate a second control signal based on a third comparison of the first exponent with the second exponent and a fourth comparison of the first LSBs with the second LSBs. The second specialized processing block may include configurable interconnect circuitry and a right shifter. The configurable interconnect circuitry may be configured to select one of the first and second LSBs based on the first and second control signals, whereby the selected one of the first and second LSBs is associated with a smaller one of the first and second double-precision floating-point numbers. The right shifter may generate a right shifted LSB signal by shifting the selected one of the first and second LSBs by a predetermined number of bits to the right.

It is appreciated that the embodiments described herein can be implemented in numerous ways, such as a process, an apparatus, a system, a device, or a method executed on a processing machine. Several inventive embodiments are described below.

In certain embodiments, the above mentioned first specialized processing block may further include additional configurable interconnect circuitry and an additional right shifter. The additional configurable interconnect circuitry may be configured to select one of the first and second MSBs based on the first control signal, wherein the selected one of the first and second MSBs is associated with the smaller one of the first and second double-precision floating-point numbers. The additional right shifter may generate a right shifted MSB signal by shifting the selected one of the first and second MSBs by the predetermined number of bits to the right and output a data signal that includes at least the predetermined number of predetermined bits of the selected one of the first and second MSBs.

If desired, the above-mentioned second specialized processing block may further include a logical OR gate that performs a logical OR operation of the data signal and the right shifted LSB signal to determine an LSB summand.

Further features of the invention, its nature and various advantages, will be apparent from the accompanying drawings and the following detailed description of the preferred embodiments.

DETAILED DESCRIPTION

Figure 1:
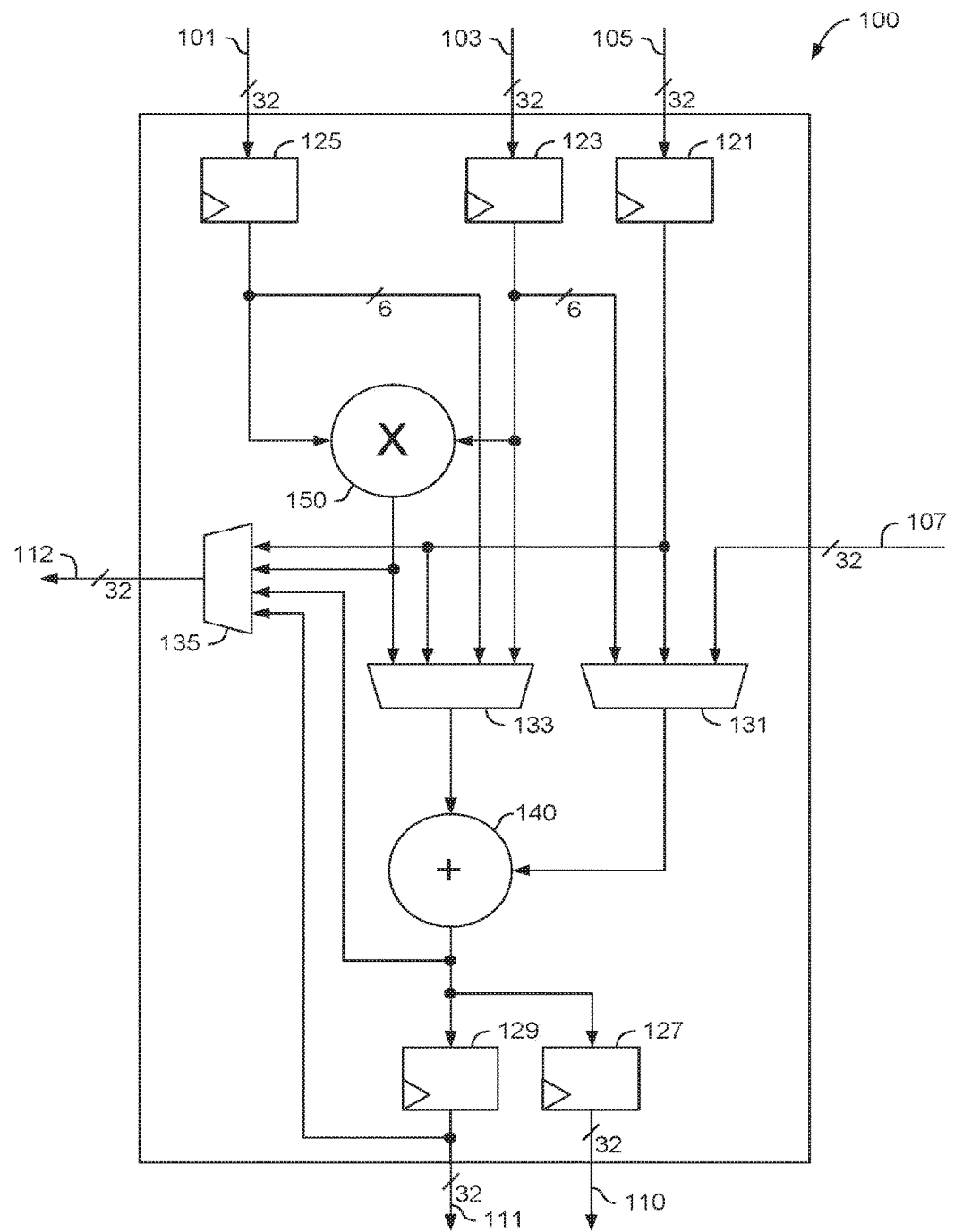
FIG. 1 is a diagram of an illustrative specialized processing block for performing either fixed-point, single-precision floating-point, or double-precision floating-point operations in accordance with an embodiment.

The present embodiments provided herein relate to integrated circuits and, more particularly, to performing double-precision floating-point addition operations using specialized processing blocks in an integrated circuit.

Floating-point numbers are commonplace for representing real numbers in scientific notation in computing systems and are designed to cover a large numeric range and diverse precision requirements. The IEEE754 standard is commonly used for floating-point numbers. A floating-point number includes three different parts: a sign, a mantissa sometimes also referred to as a significant, and an exponent. Each of these parts may be represented by a binary number and, in the IEEE754 format, have different bit sizes depending on the precision. For example, a single-precision floating-point number may require 32 bits, which are distributed as follows: one sign bit (bit 31), eight exponent bits (bits [30:23]), and 23 mantissa bits (bits [22:0]). A double-precision floating-point number may require 64 bits including one sign bit (bit 63), 11 exponent bits (bits [62:52]), and 52 mantissa bits (bits [51:0]).

According to the IEEE754 standard, a mantissa may also have additional bits. A mantissa that has additional bits is sometimes also referred to as an extended mantissa. For example, an extended, single-precision mantissa may have five additional bits (i.e., an extended, single-precision mantissa may consist of 28 bits instead of 23 bits). The last three bits added to the right of the least significant bit represent round, guard, and sticky bits.

Round and guard bits may provide additional accuracy when performing arithmetic operations. For example, dividing a mantissa with a '1' in the least significant bit position by two may result in the round bit to become '1'. An additional division by two may result in the guard bit to become '1'. Thus, round and guard bits enable the representation of numbers that are smaller than a mantissa without these additional bits may be able to represent accurately. The sticky bit may record any bits of value '1' that are shifted beyond the precision of the mantissa by performing a logical OR operation with the round and guard bits.

Two bits may be added beyond the most significant bit position, if desired, and may absorb any overflow produced by a floating-point arithmetic operation.

The sign of a floating-point number according to standard IEEE754 is represented using a single bit, where a "0" denotes a positive number and a "1" denotes a negative number.

The exponent of a floating-point number preferably is an unsigned binary number which, for the single-precision format, ranges from 0 to 255. In order to represent a very small number, it is necessary to use negative exponents. Thus, the exponent preferably has a negative bias. For single-precision floating-point numbers, the bias preferably is −127. For example, a value of 140 for the exponent actually represents (140−127)=13, and a value of 100 represents (100−127)=−27. For double-precision numbers, the exponent bias preferably is −1023.

As discussed above, according to the IEEE754 standard, the mantissa is a normalized number (i.e., it has no leading zeros and represents the precision component of a floating-point number). Because the mantissa is stored in binary format, the leading bit can either be a 0 or a 1, but for a normalized number it will always be a 1. Therefore, in a system where numbers are always normalized, the leading bit need not be stored and can be implied, effectively giving the mantissa one extra bit of precision.

Specialized processing blocks that perform arithmetic operations often include a plurality of multipliers, adders, registers, and programmable connectors (e.g., multiplexers) that allow the various components of the specialized processing block to be configured in different ways. Typically, the arithmetic operators in such specialized processing blocks have been fixed-point operators. If floating-point operators were needed, they would be constructed outside the specialized processing block (e.g., using additional logic in the integrated circuit, or using a combination of the fixed-point operators inside the specialized processing block with additional logic in the integrated circuit).

However, as applications increase in complexity, the use of floating-point operators, and in particular the use of double-precision floating-point operators, has become more common. Consequently, it is desirable to provide a specialized processing block that is adaptable to efficiently implement fixed-point operations, single-precision floating-point operations, and double-precision floating-point operations.

It will be recognized by one skilled in the art, that the present exemplary embodiments may be practiced without some or all of these specific details. In other instances, well-known operations have not been described in detail in order not to unnecessarily obscure the present embodiments.

An illustrative embodiment of a specialized processing block 100 that is adaptable to efficiently implement fixed-point operations and floating-point operations is shown in FIG. 1.

In this logical representation, implementation details, such as registers and some programmable routing features, such as multiplexers that may allow the output of a particular structure to be routed around certain components or directly out of the specialized processing block, are omitted to simplify discussion. In addition, some elements that are shown may, in an actual embodiment, be implemented more than once. For example, multiplier 150 may actually represent two or more multipliers.

As shown, specialized processing block 100 includes input ports 101, 103, 105, and 107, output ports 110, 111, and 112, registers 121, 123, 125, 127, and 129, multiplexers 131, 133, and 135, adder circuit 140, and multiplier circuit 150.

Specialized processing block 100 may produce output signals at output ports 110, 111, and 112 and receive input signals at input ports 101, 103, 105, and 107. If desired, specialized processing block 100 may be arranged in a cascade chain with other specialized processing blocks (e.g., in a row or a column) and receive one of the input signals from an adjacent specialized processing block via a direct connection at input port 107 and provide one of the output signals from output port 112 via another direct connection to another adjacent specialized processing block.

In some embodiments, specialized processing block 100 may be arranged in a cascade chain that allows sending and receiving of signals in both directions. In other words, specialized processing block 100 may receive signals from an adjacent specialized processing block via a direct connection at input port 107 and provide one of the output signals from output port 112 via another direct connection to the same adjacent specialized processing block.

Registers 121, 123, and 125 may store input signals arriving at input ports 101, 103, and 105, respectively, and registers 127 and 129 may store output signals before they are output at output ports 110, 111, and/or 112, respectively. If desired, registers may be selectively bypassed (not shown).

Configurable interconnect circuitry in specialized processing block 100 may route signals between input ports 101, 103, 105, and 107, registers 121, 123, 125, 127, and 129, adder circuit 140, multiplier circuit 150, and output ports 110 and 112. As shown, configurable interconnect circuitry may include multiplexers 131, 133, and 135 and interconnections to and from multiplexers 131, 133, and 135.

For example, multiplexer 131 may select between routing a first signal from register 123, a second signal from register 121, and a third signal from input port 107 to adder circuit 140. As another example, multiplexer 133 may select between routing a first signal from register 123, a second signal from register 121, a third signal from register 125, and a fourth signal from multiplier circuit 150 to adder circuit 140. If desired, multiplexer 135 may select between routing a first signal from register 121, a second signal from register 129, a third signal from adder circuit 140, and a fourth signal from multiplier circuit 150 to output port 112.

In the logical representation of FIG. 1, specialized processing block 100 may implement a fixed-point addition, a single-precision floating-point addition, or a portion of a double-precision floating-point addition, if desired.

In other words, a plurality of specialized processing blocks may implement together a double-precision floating-point addition of first and second double-precision floating-point numbers.

As an example, FIGS. 2A, 2B, 2C, and 2D show four specialized processing blocks that are each configured to perform a portion of a double-precision floating-point addition. In some embodiments, the specialized processing blocks of FIGS. 2A, 2B, 2C, and 2D may be identical. In other embodiments, at least one specialized processing block of the specialized processing blocks of FIGS. 2A, 2B, 2C, and 2D may be different than the other specialized processing blocks. If desired, adder circuit 140 of FIG. 1 may implement at least one of the specialized processing blocks of FIGS. 2A, 2B, 2C, and 2D.

As shown, the specialized processing blocks of FIGS. 2A, 2B, 2C, and 2D may collectively implement the addition of first and second double-precision floating-point numbers. The first double-precision floating-point number may include an exponent (e.g., EXPONENT_ONE) and a mantissa (e.g., MANTISSA_ONE) which may be partitioned into MSBs (e.g., MANTISSA_ONE[52:30]) and LSBs (e.g., MANTISSA_ONE[29:1]). Similarly, the second double-precision floating-point number may include an exponent (e.g., EXPONENT_TWO) and a mantissa (e.g., MANTISSA_TWO) which may be partitioned into MSBs (e.g., MANTISSA_TWO[52:30]) and LSBs (e.g., MANTISSA_TWO[29:1]).

Figure 2A:
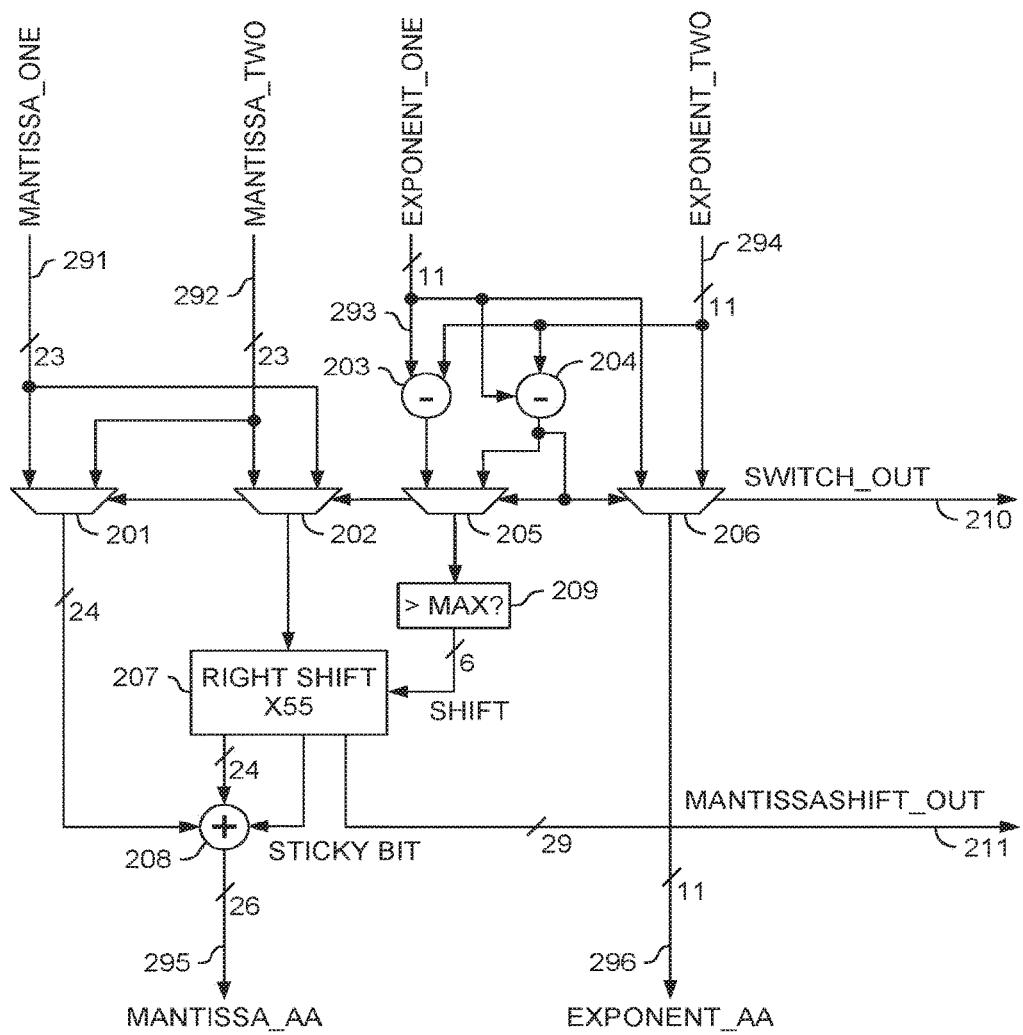
FIG. 2A is a diagram of an illustrative specialized processing block that performs a first portion of a double-precision floating-point addition of first and second double-precision floating-point numbers in accordance with an embodiment.

The specialized processing block of FIG. 2A may receive the MSBs of the first and second mantissas (i.e., MANTISSA_ONE[52:30] and MANTISSA_TWO[52:30]) at inputs 291 and 292, respectively, and the first and second exponents (i.e., EXPONENT_ONE and EXPONENT_TWO) at inputs 293 and 294, respectively. The specialized processing block may compare the first and second exponents (e.g., using subtractor 204) as well as the MSBs of the first and second mantissas to determine the smaller one of the first and second double-precision floating-point numbers.

The specialized processing block may use the result of the comparison as a control signal to control multiplexers 201, 202, 205, and 206. For example, multiplexer 201 may select between the first and second MSBs the one that is associated with the greater one and multiplexer 202 the one that is associated with the smaller one of the first and second double-precision floating-point numbers.

The control signal may direct multiplexer 206 to select the first exponent if the first double-precision floating-point number is greater than the second double-precision floating-point number, and the control signal may direct multiplexer 206 to select the second exponent if the second double-precision floating-point number is greater than the first double-precision floating-point number. If desired, the specialized processing block may output the selected exponent (e.g., EXPONENT_AA) at output 296 and the control signal (e.g., SWITCH_OUT) at output 210.

If desired, the control signal SWITCH_OUT at output 210 may be a two-bit signal. The first bit may indicate which of the first and second double-precision floating-point numbers is larger, based on the comparison of the exponents and the comparison of the MSBs of the mantissas. The second bit may indicate whether the exponents and the MSBs of the mantissas are identical. The reason for having a second bit will be described in the context of FIG. 2B below.

Multiplexer 205 may generate, together with subtractors 203 and 204, the absolute value of the difference between the first and second exponents based on the control signal by subtracting the first from the second exponent in subtractor 203, by subtracting the second from the first exponent in subtractor 204, by selecting the difference from subtractor 203 in multiplexer 205 if the second double-precision floating-point number is greater than the first double-precision floating-point number, and by selecting the difference from subtractor 204 in multiplexer 205 if the first double-precision floating-point number is greater than the second double-precision floating-point number.

The absolute value of the difference between the first and second exponents may serve as a shift value in a right shift operation in right shift circuit 207, which is sometimes also referred to as a right shifter. Circuit 209 may compare the shift value to the size of a double-precision floating-point mantissa (e.g., to check whether the shift value is greater than 55) to determine whether the shift value is saturated.

Right shift circuit 207 may shift the selected one of the first and second MSBs from multiplexer 202 a number of bits to the right that corresponds to the absolute value of the difference between the first and second exponents, thereby aligning the MSBs of the mantissas of the first and second double-precision floating-point numbers.

If desired, right shift circuit 207 may output a data signal, such as data signal MANTISSASHIFT_OUT at output 211. If desired, data signal MANTISSASHIFT_OUT may include 29 trailing bits that are the result of the right shift operation.

Adder circuit 208 may add the aligned MSBs of the mantissas of the first and second double-precision floating-point numbers (i.e., the signal from multiplexer 201 and the signal from right shifter 207) to determine a partial mantissa sum and provide the partial mantissa sum (e.g., MANTISSA_AA) at output 295. The partial mantissa sum is an unnormalized mantissa that may be larger than one, larger than two, or smaller than one, or zero.

Figure 2B:
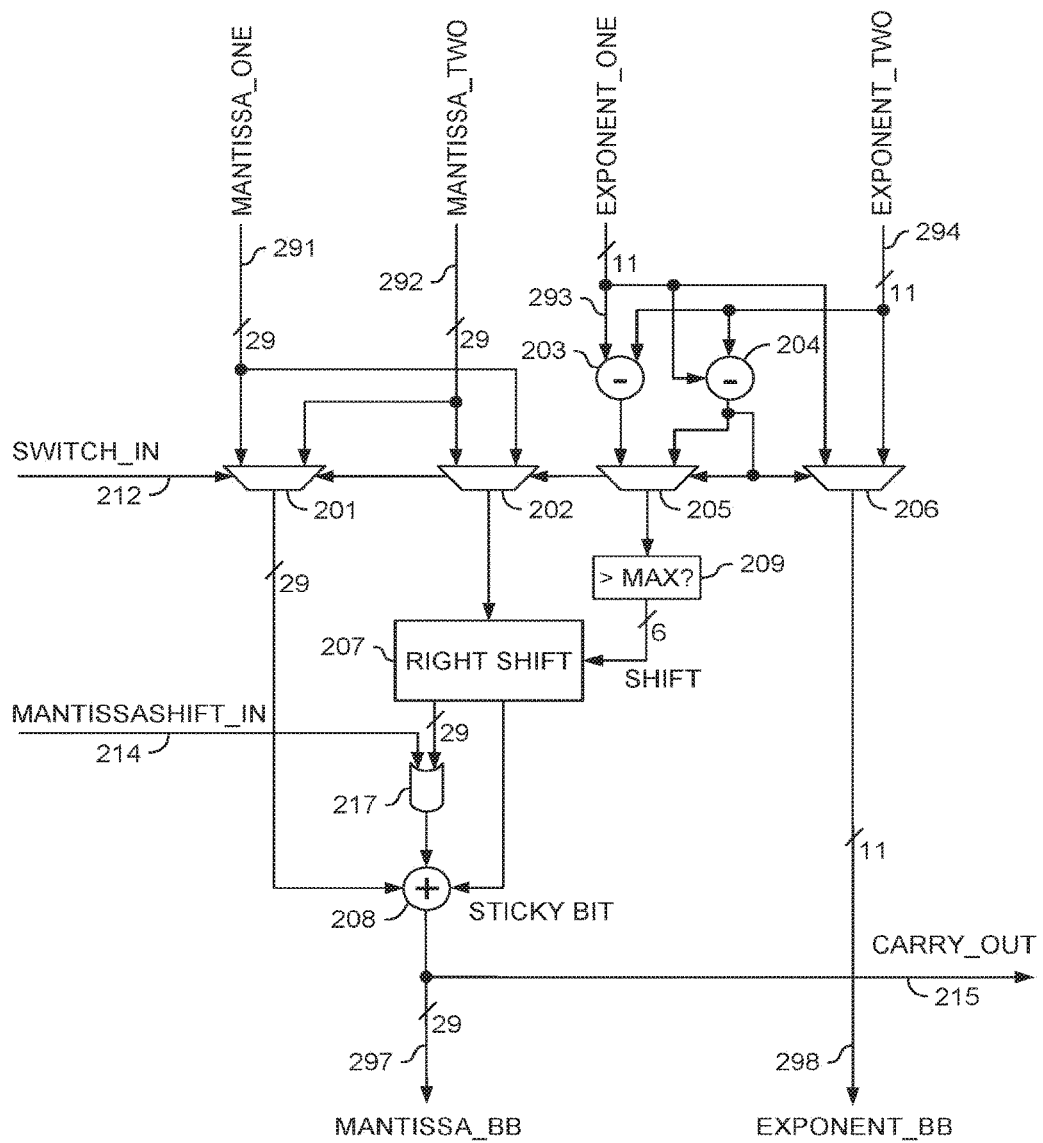
FIG. 2B is a diagram of an illustrative specialized processing block that performs a second portion of a double-precision floating-point addition of first and second double-precision floating-point numbers in accordance with an embodiment.

The specialized processing block of FIG. 2B may receive the LSBs of the first and second mantissas (i.e., MANTISSA_ONE[29:1] and MANTISSA_TWO[29:1]) at inputs 291 and 292, respectively, the first and second exponents (i.e., EXPONENT_ONE and EXPONENT_TWO) at inputs 293 and 294, respectively, control signal SWITCH_IN at input 212 and control signal MANTISSASHIFT_IN at input 214.

In some embodiments, the specialized processing blocks of FIGS. 2A and 2B may be arranged in a cascade chain, and the specialized processing block of FIG. 2B may receive control signal SWITCH_IN and data signal MANTISSASHIFT_IN over a cascade connection from the specialized processing block of FIG. 2A. For example, control signal SWITCH_IN and data signal MANTISSASHIFT_IN may be control signal SWITCH_OUT from output 210 and data signal MANTISSASHIFT_OUT from output 211 of the specialized processing block of FIG. 2A, respectively. In this example, control signal SWITCH_IN and data signal MANTISSASHIFT_IN may be two-bit and 29-bit wide, respectively. The cascade connection may be a direct connection, which is sometimes also referred to as a dedicated direct connection, between the specialized processing blocks of FIGS. 2A and 2B.

The specialized processing block of FIG. 2B may determine the smaller one of the first and second double-precision floating-point numbers based on the control signal SWITCH_IN and another comparison of the first and second exponents (e.g., using subtractor 204) as well as a comparison of the LSBs of the first and second mantissas (not shown).

In some embodiments, two neighboring specialized processing blocks that have the same circuitry may implement the specialized processing blocks of FIGS. 2A and 2B, whereby the LSBs of the mantissas are compared in FIG. 2B. In some rare cases, the exponents and the MSBs of the mantissas are identical, which control signal SWITCH_OUT of the specialized processing block of FIG. 2A and control signal SWITCH_IN may signal on the second bit. In this case, the comparison of the LSBs of the mantissas in the specialized processing block of FIG. 2B may determine the control signal for multiplexers 201 and 202 in the specialized processing block of FIG. 2B. The MSBs of the mantissa and the exponents of the specialized processing block in 2A would be identical, and thus, the control signal for multiplexers 201 and 202 in the specialized processing block of FIG. 2A may be selected arbitrarily.

As an example, the comparison of the first and second LSBs may determine the smaller one of the first and second double-precision floating-point numbers if the first and second exponents and the first and second MSBs are equal. As another example, the control signal SWITCH_IN may determine the smaller one of the first and second double-precision floating-point numbers if the first and second MSBs are different or if the first and second exponents are different.

The specialized processing block may control multiplexers 201, 202, 205, and 206 based on which one of the first or the second double-precision floating-point number is smaller than the other (e.g., using the control signal SWITCH_IN and the result of the comparison of the first and second exponents and the first and second LSBs). For example, multiplexer 201 may select between the first and second LSBs the one that is associated with the greater one and multiplexer 202 the one that is associated with the smaller one of the first and second double-precision floating-point numbers.

Multiplexer 206 may select the first exponent if the first double-precision floating-point number is greater than the second double-precision floating-point number and the second exponent if the second double-precision floating-point number is greater than the first double-precision floating-point number. If desired, the specialized processing block may output the selected exponent (e.g., EXPONENT_BB) at output 298.

Multiplexer 205 may generate, together with subtractors 203 and 204, the absolute value of the difference between the first and second exponents based on the comparison between the first and second double-precision floating-point numbers by subtracting the first from the second exponent in subtractor 203, by subtracting the second from the first exponent in subtractor 204, by selecting the difference from subtractor 203 in multiplexer 205 if the second double-precision floating-point number is greater than the first double-precision floating-point number, and by selecting the difference from subtractor 204 in multiplexer 205 if the first double-precision floating-point number is greater than the second double-precision floating-point number.

The absolute value of the difference between the first and second exponents may serve as a shift value in a right shift operation in right shift circuit 207, which is sometimes also referred to as a right shifter. Circuit 209 may compare the shift value to the bit size of a double-precision floating-point mantissa (e.g., to check whether the shift value is greater than 55) to determine whether the shift value is saturated.

Right shift circuit 207 may shift the selected one of the first and second LSBs from multiplexer 202 a number of bits to the right. The number of bits may correspond to the absolute value of the difference between the first and second exponents, thereby aligning the LSBs of the mantissas of the first and second double-precision floating-point numbers.

If desired, right shift circuit 207 may output a sticky bit that may be the result of the right shift operation. For example, a logical OR operation of the bits that are shifted beyond the precision of the LSBs may determine the sticky bit.

The mantissa bits received as data signal MANTISSASHIFT_IN at input 214 may be concatenated with the signal from right shift circuit 207. For example, logical OR gate 217 may perform a logical OR operation of the data signal MANTISSASHIFT_IN with the signal from right shift circuit 207 to perform the concatenation of the two signals.

Adder circuit 208 may add the aligned LSBs of the mantissas of the first and second double-precision floating-point numbers (i.e., the signal from multiplexer 201 with the signal from logical OR gate 217) to determine a partial mantissa sum and a carry signal. The specialized processing block may provide the partial mantissa sum (e.g., MANTISSA_BB) at output 297 and the carry signal (e.g., CARRY_OUT) at output 215.

Figure 2C:
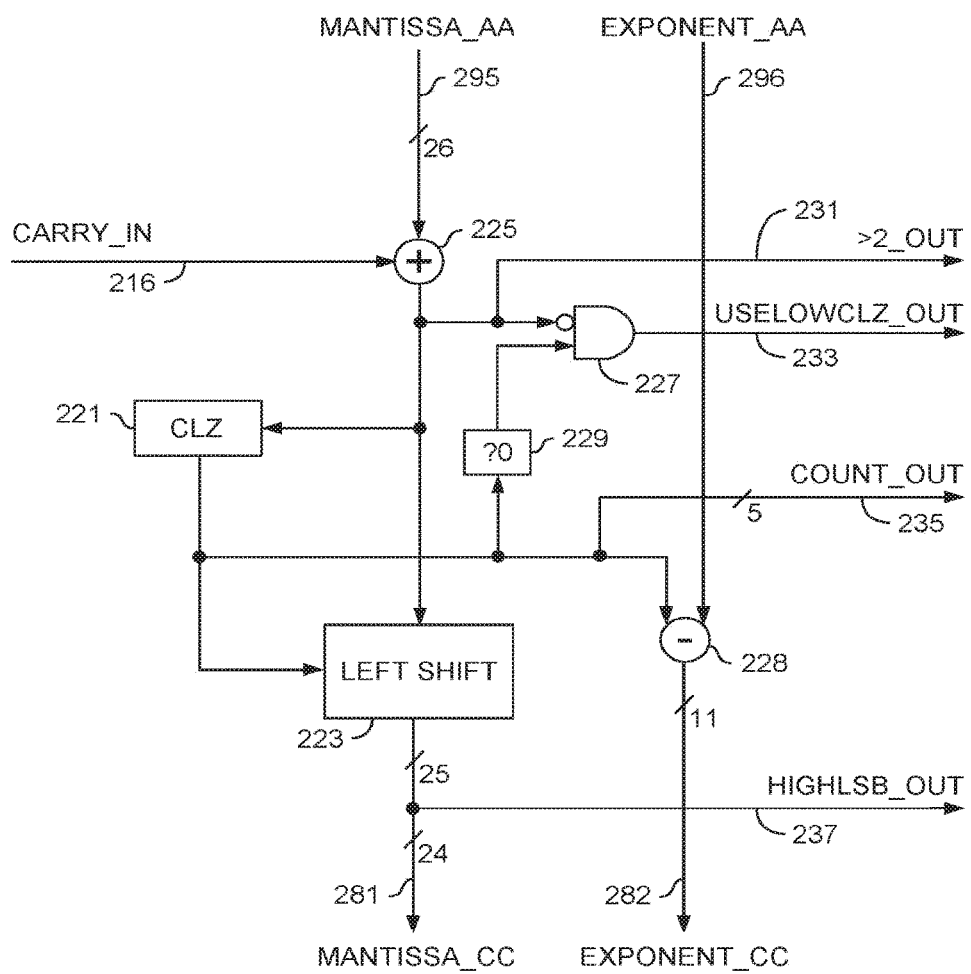
FIG. 2C is a diagram of an illustrative specialized processing block that performs a third portion of a double-precision floating-point addition of first and second double-precision floating-point numbers in accordance with an embodiment.

The specialized processing block of FIG. 2C may receive a partial mantissa sum (e.g., MANTISSA_AA) at input 295, a selected exponent (e.g., EXPONENT_AA) at input 296, and carry signal CARRY_IN at input 216. In some embodiments, the specialized processing blocks of FIGS. 2B and 2C may be arranged in a cascade chain, and the specialized processing block of FIG. 2C may receive carry signal CARRY_IN from the specialized processing block of FIG. 2B. If desired, the carry signal may be conveyed from the specialized processing block of FIG. 2B via a direct connection, which is sometimes also referred to as a dedicated direct connection, to the specialized processing block of FIG. 2C. The specialized processing block of FIG. 2C may use adder circuit 225 to add the carry signal CARRY_IN to the partial mantissa sum MANTISSA_AA, thereby generating another partial mantissa.

The partial mantissa at the output of adder circuit 225 is an unnormalized mantissa that may be larger than one, larger than two, or smaller than one, or zero. If desired, the specialized processing block may normalize the unnormalized partial mantissa by performing a left shift or a right shift operation. As an example, the specialized processing block may generate a control signal (e.g., signal >2_OUT), for example by inspecting the overflow of adder 225, to indicate that the partial mantissa has a value greater than or equal to two and needs to be right shifted during normalization rather than left shifted. Thus, the control signal may indicate to another specialized processing block that the LSBs of the mantissa may need to be right shifted during normalization.

Circuit 221 may determine the number of leading zeros of the partial mantissa at the output of adder circuit 225 to determine the number of bits by which the partial mantissa needs to be left shifted during normalization. If desired, circuit 221 may output a zero if all bits of the partial mantissa are zero or if the most significant bit of the partial mantissa is one (i.e., no left shift required). In some embodiments, circuit 221 may output a negative one to indicate a right shift operation by one bit is required for normalization of the partial mantissa.

The partial mantissa may be left-shifted in left shift circuit 223, which is sometimes also referred to as left shifter, by the number of bits found in circuit 221 to generate a leading '1'. In some embodiments, left shift circuit 223 may perform a right shift operation if circuit 221 outputs a negative one to eliminate the overflow and produce a leading '1'.

The leading '1' may be eliminated because a leading '1' is implied by the IEEE754 standard. In some embodiments, the specialized processing block may generate mantissa MANTISSA_CC with the leading '1' and output mantissa MANTISSA_CC at output 281. Downstream circuitry may eliminate the leading '1' to achieve compliance with the IEEE754 standard, if desired. Left shift circuit 223 may generate a control signal (e.g., signal HIGHLSB_OUT) that the specialized processing block may output at output 237. The control signal HIGHLSB_OUT may be the least significant bit out of left shift circuit 223. The control signal HIGHLSB_OUT may be used for a right shift operation into the LSBs of the mantissa that is handled in an additional specialized processing block.

During normalization, the specialized processing block may use subtractor 228 to subtract an offset adjustment (e.g., the number of bits found in circuit 221) from the greater exponent (e.g., EXPONENT_AA) to account for the left shift operation in left shift circuit 223, thereby generating exponent EXPONENT_CC and providing the exponent at output 282. In some embodiments, subtractor 228 may subtract negative one if circuit 221 outputs a negative one and the partial mantissa is right shifted in left shift circuit 223.

The offset adjustment may be used by an additional specialized processing block to perform normalization. If desired, the specialized processing block may provide the number as an additional control signal (e.g., signal COUNT_OUT) at output 235.

Circuit 229 may receive the output of circuit 221 and generate a one if the output of circuit 221 generates a zero or a negative number, thereby indicating that left shift circuit 223 either performs a right shift operation or performs no shift operation.

If circuit 221 outputs a zero (i.e., the output of circuit 229 is one) and the output of adder circuit 225 is not greater than two (i.e., signal >2_OUT is zero) there may be no shift required, because all bits of the output of adder circuit 225 are zero. In other words, any significant bits may be found in the LSBs of the mantissas that may be generated in an additional specialized processing block. The specialized processing block may generate a control signal (e.g., signal USELOWCLZ_OUT) using circuit 229 and logical AND gate 227 with the signal from adder circuit 225 being inverted to indicate that an additional specialized processing block may need to determine the number of bits to be left shifted to achieve normalization of the mantissa. Alternatively, the logical AND gate 227 with the inverted signal from adder circuit 225 may be replaced by a logical exclusive OR gate with a non-inverted signal from adder circuit 225. If desired, the specialized processing block may provide such a control signal (e.g., signal USELOWCLZ_OUT) at output 233.

Figure 2D:
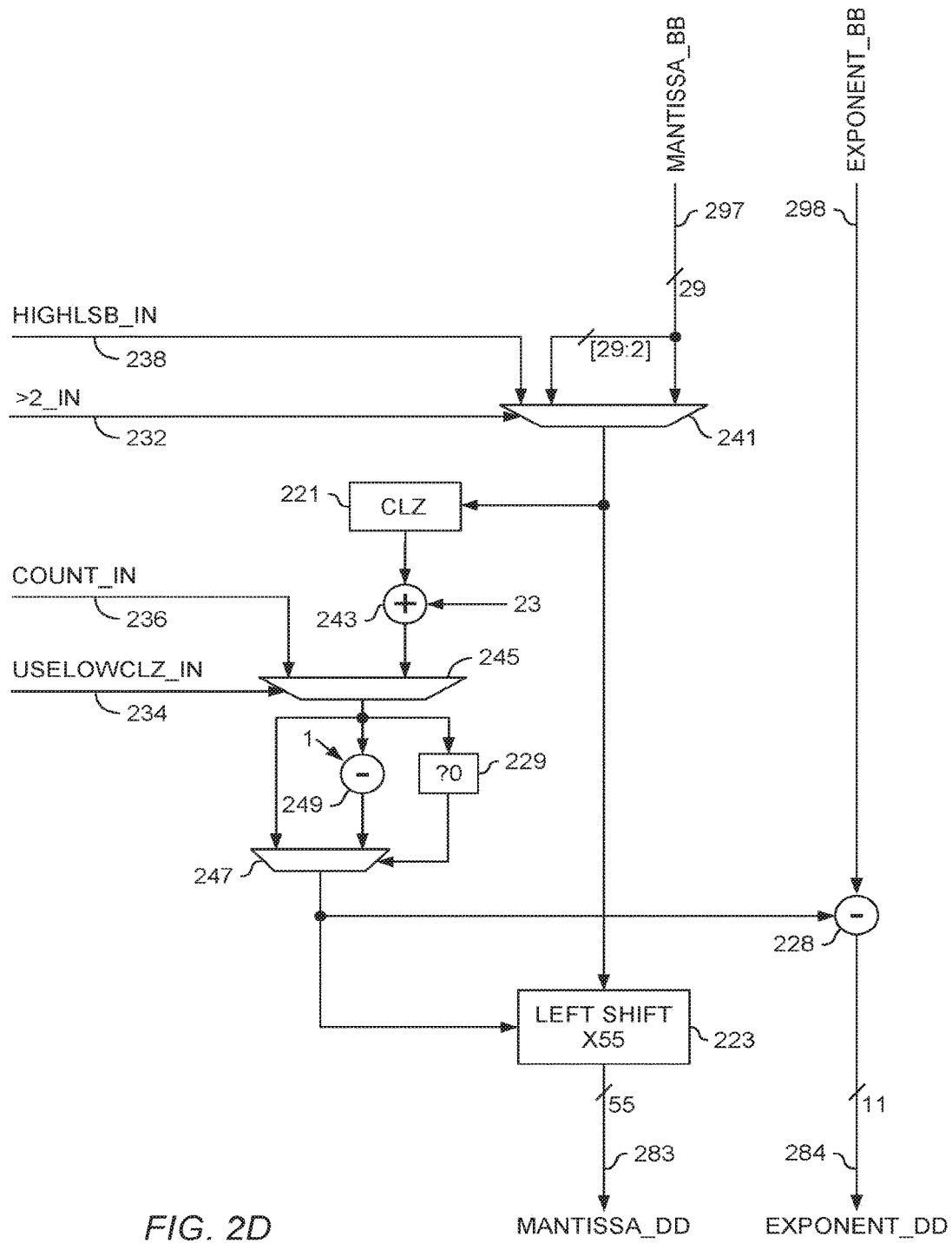
FIG. 2D is a diagram of an illustrative specialized processing block that performs a fourth portion of a double-precision floating-point addition of first and second double-precision floating-point numbers in accordance with an embodiment.

The specialized processing block of FIG. 2D may perform normalization of the LSBs of the mantissa. As shown, the specialized processing block of FIG. 2D may receive a partial mantissa (e.g., MANTISSA_BB) at input 297, a selected exponent (e.g., EXPONENT_BB) at input 298, and control signals such as signals HIGHLSB_IN, >2_IN, COUNT_IN, and USELOWCLZ_IN at inputs 238, 232, 236, and 234, respectively. In some embodiments, the specialized processing blocks of FIGS. 2C and 2D may be arranged in a cascade chain, and the specialized processing block of FIG. 2D may receive at least one of the control signals from the specialized processing block of FIG. 2C. If desired, the at least one of the control signals may be conveyed from the specialized processing block of FIG. 2C via a direct connection, which is sometimes also referred to as a dedicated direct connection, to the specialized processing block of FIG. 2D.

The specialized processing block of FIG. 2D may use multiplexer 241 to shift the partial mantissa MANTISSA_BB one bit to the right based on control signals HIGHLSB_IN and >2_IN. For example, control signal >2_IN may indicate that the partial mantissa of FIG. 2C (i.e., the output of adder circuit 225 of FIG. 2C) has a value greater than or equal to two and needs to be right shifted during normalization rather than left shifted. To perform a right shift operation, the control signal >2_IN may select the bit shifted out of the partial mantissa of FIG. 2C (i.e., signal HIGHLSB_IN) concatenated with a portion of partial mantissa MANTISSA_BB. Multiplexer 241 may select the partial mantissa MANTISSA_BB if the control signal >2_IN indicates that the generated partial mantissa sum of FIG. 2C has a value that is smaller than two.

Circuit 221 may determine the number of leading zeros of the partial mantissa from multiplexer 241 to determine the number of bits by which the partial mantissa needs to be left shifted during normalization. Since circuit 221 only determines the number of leading zeros of the LSBs of the mantissa, adder circuit 243 may need to add the number of MSBs that are computed as part of another partial mantissa using another specialized processing block (e.g., partial mantissa MANTISSA_CC computed using the specialized processing block of FIG. 2C). As shown, the output of multiplexer 241 may include the 29 LSBs of a double-precision floating-point mantissa. Thus, adder circuit 243 may add the number 23 to the number of leading zeros determined by circuit 221 to achieve a leading '1' after a subsequent left shift operation.

As shown, multiplexer 245 may select between the output of adder circuit 243 and control signal COUNT_IN from input 236 based on control signal USELOWCLZ_IN from input 234. Control signal COUNT_IN may indicate the left shift amount that another specialized processing block (e.g., the specialized processing block of FIG. 2C) has used to perform normalization of the MSBs of the mantissa. Thus, control signal USELOWCLZ_IN may direct multiplexer 245 to select the control signal COUNT_IN if the other specialized processing block (e.g., the specialized processing block of FIG. 2C) has detected significant bits in the MSBs of the mantissa and select the output of adder circuit 243 if the other specialized processing block has determined that any significant bits may be found in the LSBs of the mantissas (i.e., in the specialized processing block of FIG. 2D).

Subtractor 249 may subtract '1' from the output of multiplexer 245, and circuit 229 may determine whether the output of multiplexer 245 is zero. For example, the output of multiplexer 245 may be zero if the mantissa is greater than or equal to two and has already been right shifted using multiplexer 241. In this example, circuit 229 may direct multiplexer 247 to select the output of subtractor 249 as an offset adjustment. Otherwise, circuit 229 may direct multiplexer 247 to select the output of multiplexer 245 as the offset adjustment.

The partial mantissa from multiplexer 241 may be left-shifted in left shift circuit 223, which is sometimes also referred to as left shifter, by the number of bits from multiplexer 247 to obtain a leading '1'. The leading '1' may be eliminated because a leading '1' is implied by the IEEE754 standard. In some embodiments, the specialized processing block may produce the leading '1' as part of mantissa MANTISSA_DD at output 283, and downstream circuitry may eliminate the leading '1' to achieve compliance with the IEEE754 standard, if desired. As shown, mantissa MANTISSA_DD may include 55 bits to allow for subsequent rounding operations. Circuitry outside of the specialized processing blocks of FIGS. 2C and 2D may perform these subsequent rounding operations. Similarly, exception handling may be provided using circuitry outside of the specialized processing blocks.

During normalization, the specialized processing block may use subtractor 228 to subtract the offset adjustment (e.g., the number of bits from multiplexer 247) from the greater exponent (e.g., EXPONENT_BB) to account for the left shift operation in left shift circuit 223, thereby generating exponent EXPONENT_DD and providing the exponent at output 284. Subtractor 228 may subtract '−1' from the greater exponent if the mantissa is greater than two and has been right shifted using multiplexer 241.

If desired, additional circuitry (not shown) may perform the remaining computation steps to determine the mantissa result and the exponent result of the double-precision floating-point addition of first and second double-precision floating-point numbers. In some embodiments, circuitry outside the specialized processing blocks of FIGS. 2C and 2D may implement the additional circuitry.

For example, the mantissa result may be determined by performing a logical OR operation between the 23 LSBs of MANTISSA_CC (i.e., MANTISSA_CC[23:1]) and the 23 MSBs of MANTISSA_DD (i.e., MANTISSA_DD[52:30] after rounding) and concatenating the output of the logical OR operation with the 29 LSBs of MANTISSA_DD (i.e., MANTISSA_DD[29:1]). The exponent result of the double-precision floating-point addition may be EXPONENT_DD if control signal USELOWCLZ_IN is logical one and EXPONENT_CC otherwise.

As an example, the specialized processing block of FIG. 2C may set the signal EXPONENT_CC at output 282 to zero if control signal USELOWCLZ_OUT is active, and the specialized processing block of FIG. 2D may set the signal EXPONENT_DD at output 284 to zero if control signal USELOWCLZ_IN is inactive. If desired, a logical OR gate that performs a bitwise logical OR operation of signals EXPONENT_CC and EXPONENT_DD may determine the exponent output of the floating-point addition.

Figure 3:
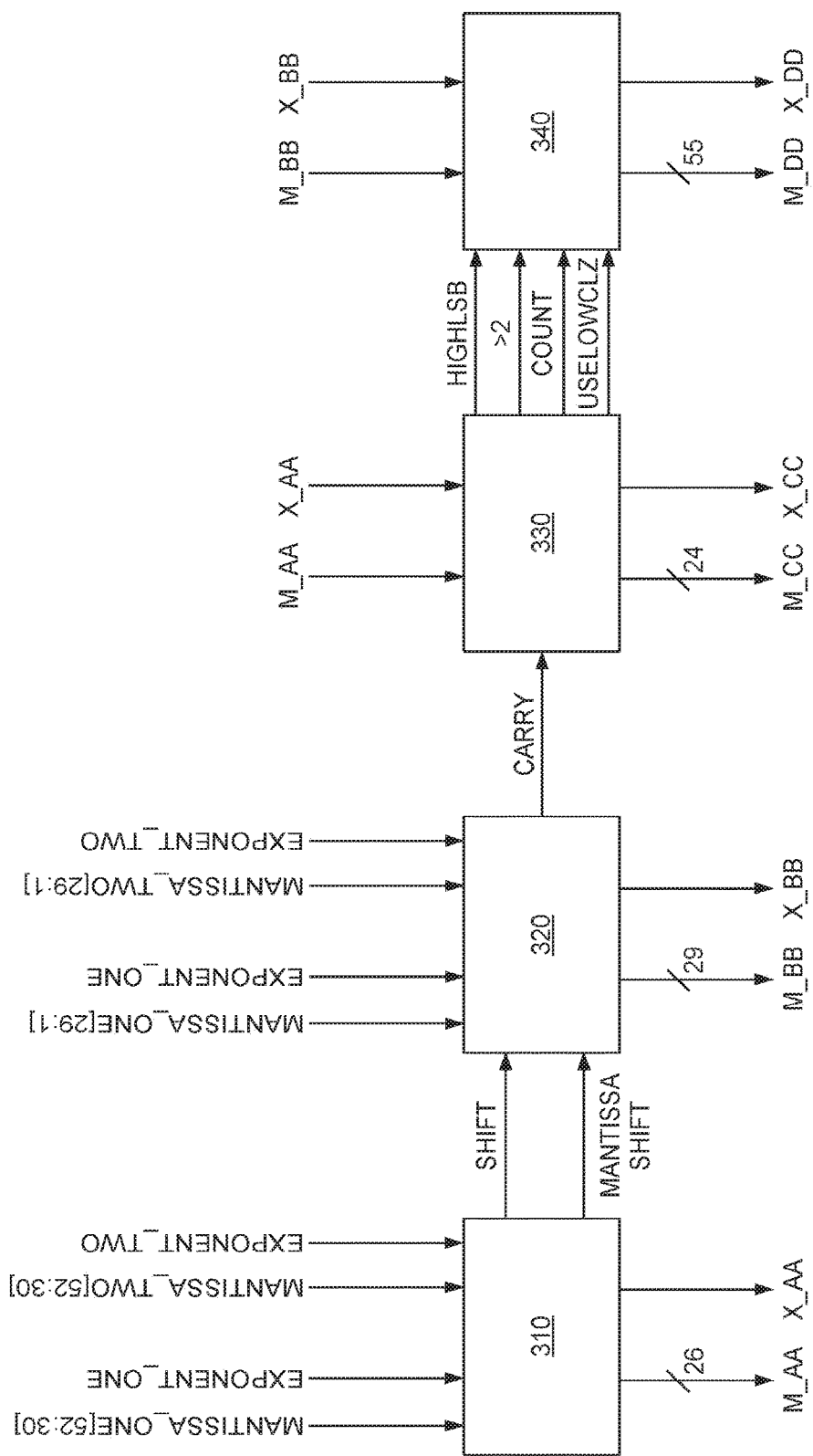
FIG. 3 is a diagram of an illustrative plurality of specialized processing blocks arranged in a cascade chain that perform a double-precision floating-point addition of first and second double-precision floating-point numbers in accordance with an embodiment.

FIG. 3 shows an embodiment of specialized processing blocks 310, 320, 330, and 340 (e.g., the four specialized processing blocks from FIGS. 2A, 2B, 2C, and 2D, respectively) arranged in a cascade chain to perform a double-precision floating-point addition of double-precision floating-point number ONE having a mantissa (Mantissa_ONE) and an exponent (Exponent_ONE) and double-precision floating-point number TWO having a mantissa (Mantissa_TWO) and an exponent (Exponent_TWO).

In some embodiments, one or more specialized processing blocks of specialized processing blocks 310, 320, 330, and 340 may be identical. For example, specialized processing block 100 of FIG. 1 may implement specialized processing blocks 310, 320, 330, and 340. In this example, four identical specialized processing blocks may each be configured differently such that the configured specialized processing blocks implement the respective functionality of specialized processing blocks 310, 320, 330, and 340 of FIG. 3.

If desired, specialized processing blocks 310, 320, 330, and 340 may be arranged in a row or a column. If desired, a row or a column may include more than four specialized processing blocks. In the example in which four identical specialized processing blocks are configured differently to implement the functionality of specialized processing blocks 310, 320, 330, and 340, any subset of four neighboring specialized processing blocks in a row or a column may implement a double-precision floating-point addition. If desired, an integrated circuit may include one or more rows or columns of specialized processing blocks.

First and second double-precision floating-point numbers may have 52-bit mantissas and 11-bit exponents. Specialized processing blocks 310 and 320 may receive the exponents and a respective portion of the mantissas of first and second double-precision floating-point numbers. For example, specialized processing block 310 may receive the 23 most significant bits (MSBs) of the respective mantissas (i.e., MANTISSA_ONE[52:30] and MANTISSA_TWO[52:30]) and the respective exponents (i.e., EXPONENT_ONE and EXPONENT_TWO), and specialized processing block 320 may receive the 29 least significant bits (LSBs) of the respective mantissas (i.e., MANTISSA_ONE[29:1] and MANTISSA_TWO[29:1]) and the respective exponents i.e., EXPONENT_ONE and EXPONENT_TWO).

Specialized processing block 310 may generate a partial result of the respective mantissa portions of the first and second double-precision floating-point numbers (e.g., M_AA) and a partial result of the exponents of the first and second double-precision floating-point numbers (e.g., X_AA).

If desired, specialized processing block 310 may generate control and data signals (e.g., signals SHIFT and MANTISSASHIFT) and provide the control and data signals via a direct connection to specialized processing block 320.

Specialized processing block 320 may generate a partial result of the respective mantissa portions of the first and second double-precision floating-point numbers (e.g., M_BB) and a partial result of the exponents of the first and second double-precision floating-point numbers (e.g., X_BB).

If desired, specialized processing block 320 may generate a carry signal (e.g., signal CARRY) and provide the carry signal via a direct connection to specialized processing block 330.

Specialized processing block 330 may receive the partial results from specialized processing block 310 and the carry signal from specialized processing block 320 and generate another partial result of the respective mantissa portions of the first and second double-precision floating-point numbers (e.g., M_CC) and another partial result of the exponents of the first and second double-precision floating-point numbers (e.g., X_CC).

If desired, specialized processing block 330 may generate control signals (e.g., HIGHLSB, >2, COUNT, and USELOWCLZ) and provide the control signals via a direct connection to specialized processing block 340.

Specialized processing block 340 may receive the partial results from specialized processing block 320 and the control signals from specialized processing block 330 and generate another partial result of the respective mantissa portions of the first and second double-precision floating-point numbers (e.g., M_DD) and another partial result of the exponents of the first and second double-precision floating-point numbers (e.g., X_DD).

The mantissa result of the double-precision floating-point addition may be determined by performing a logical OR operation between the 23 LSBs of M_CC (i.e., M_CC[23:1]) and the 23 MSBs of M_DD (i.e., M_DD[52:30]) and concatenating the output of the logical OR operation with the 29 LSBs of MDD (i.e., M_DD[29:1]). The exponent result of the double-precision floating-point addition may be X_DD if control signal USELOWCLZ is logical one and X_CC otherwise.

Consider the scenario in which a plurality of specialized processing blocks is arranged in a cascade chain that allows sending and receiving of signals in both directions. In such a scenario, two specialized processing blocks may implement a double-precision floating-point addition.

Figure 4:
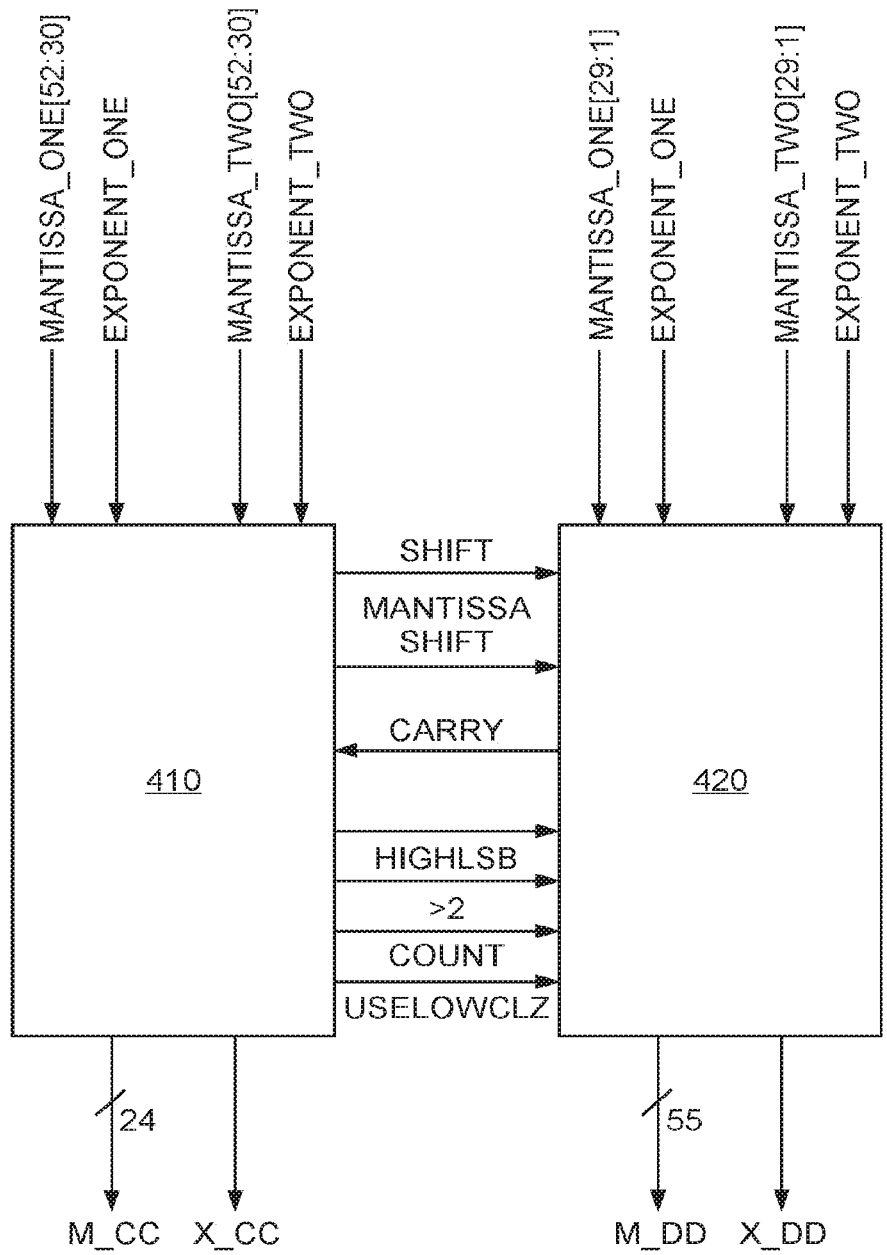
FIG. 4 is a diagram of illustrative two specialized processing blocks that perform a double-precision floating-point addition of first and second double-precision floating-point numbers in accordance with an embodiment.

An embodiment of two specialized processing blocks that are arranged in a cascade chain, whereby each of the two specialized processing blocks can send and receive signals in both directions of the cascade chain is shown in FIG. 4. As shown in FIG. 4, specialized processing blocks 410 and 420 may implement a double-precision floating-point addition of first and second double-precision floating-point numbers.

For example, specialized processing block 410 may receive the 23 most significant bits (MSBs) of the respective mantissas (i.e., MANTISSA_ONE[52:30] and MANTISSA_TWO[52:30]) and the respective exponents (i.e., EXPONENT_ONE and EXPONENT_TWO), and specialized processing block 420 may receive the 29 least significant bits (LSBs) of the respective mantissas (i.e., MANTISSA_ONE[29:1] and MANTISSA_TWO[29:1]) and the respective exponents (i.e., EXPONENT_ONE and EXPONENT_TWO).

If desired, specialized processing block 410 may implement the functionality of specialized processing blocks 310 and 330 of FIG. 3, and specialized processing block 420 may implement the functionality of specialized processing blocks 320 and 340 of FIG. 3.

In other words, specialized processing block 410 may generate a partial result of the respective mantissa portions of the first and second double-precision floating-point numbers (e.g., M_CC) and a partial result of the exponents of the first and second double-precision floating-point numbers (e.g., X_CC).

If desired, specialized processing block 410 may generate control and data signals (e.g., SHIFT, MANTISSASHIFT, HIGHLSB, >2, COUNT, and USELOWCLZ) and provide the control and data signals via a direct connection to specialized processing block 420.

Specialized processing block 420 may generate another partial result of the respective mantissa portions of the first and second double-precision floating-point numbers (e.g., M_DD) and another partial result of the exponents of the first and second double-precision floating-point numbers (e.g., X_DD). If desired, specialized processing block 420 may generate a carry signal (e.g., CARRY) and provide the carry signal via a direct connection to specialized processing block 410.

Figure 5A:
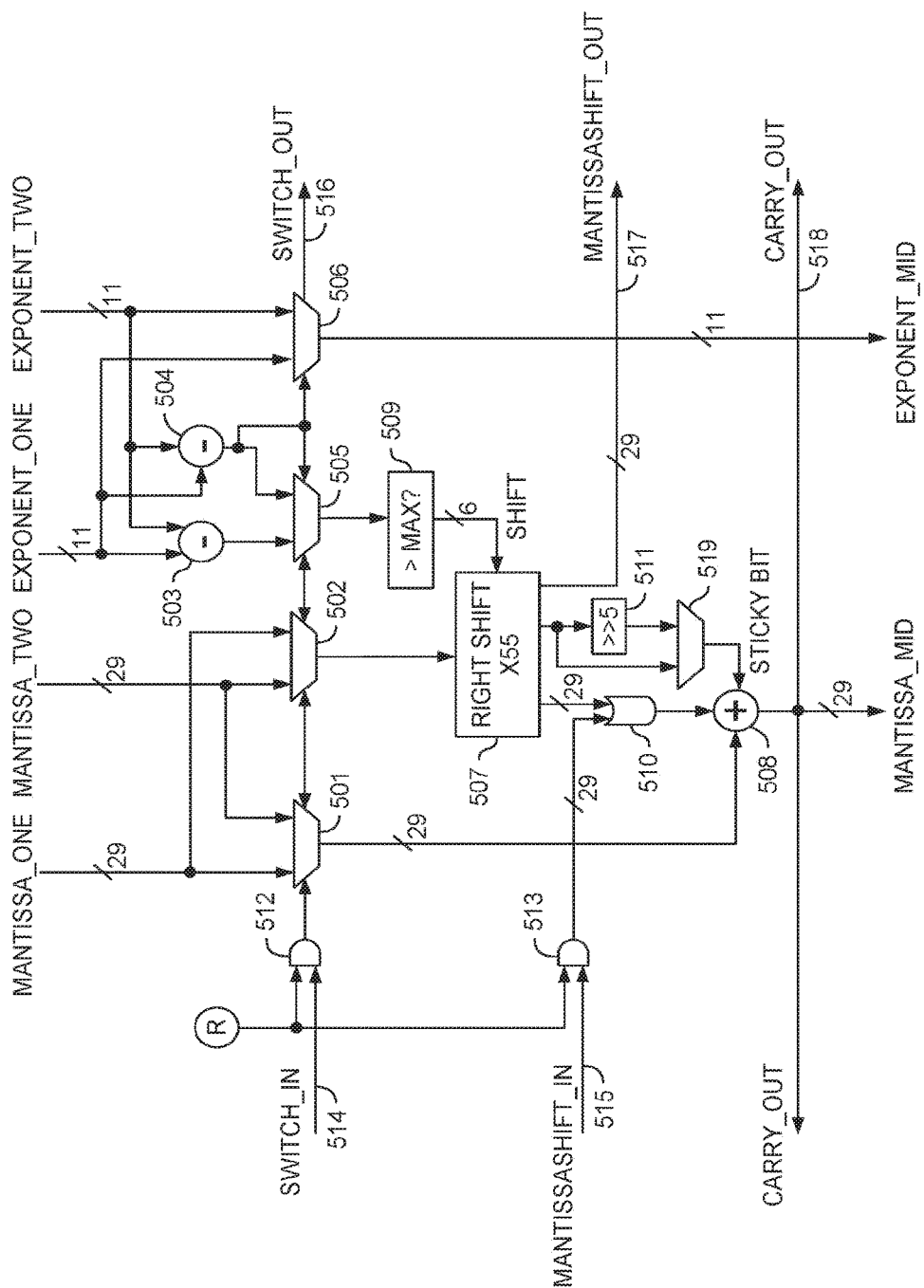
FIG. 5A is a diagram of an illustrative circuit that implements a first portion of one of the specialized processing blocks of FIG. 4 in accordance with an embodiment.
Figure 5B:
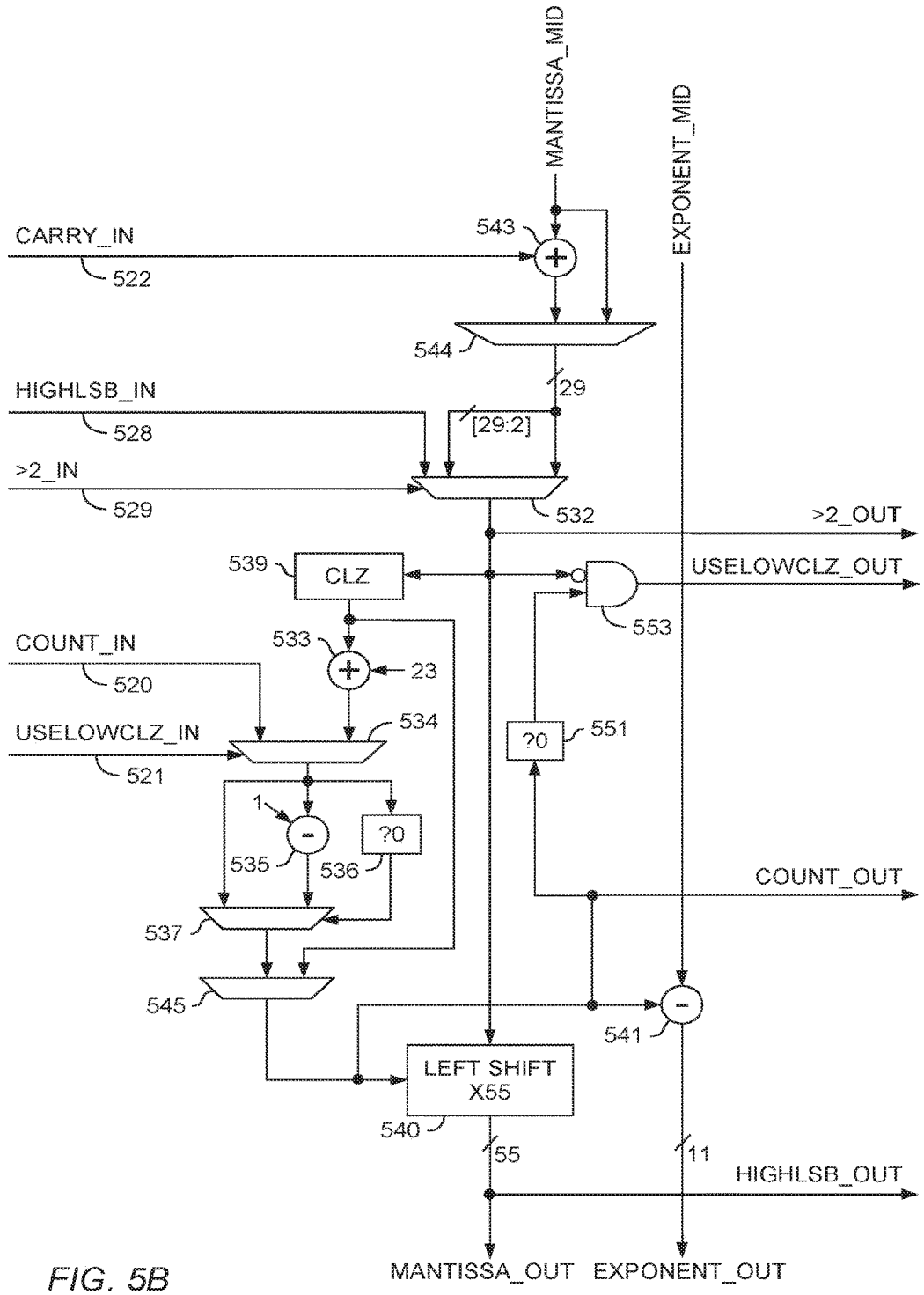
FIG. 5B is a diagram of an illustrative circuit that implements a second portion of one of the specialized processing blocks of FIG. 4 in accordance with an embodiment.

An embodiment of a specialized processing block such as specialized processing block 410 or 420 of FIG. 4 is shown in FIGS. 5A and 5B. FIGS. 5A and 5B may together form a single specialized processing block with a denormalization portion shown in FIG. 5A and a normalization portion shown in FIG. 5B. Two such specialized processing blocks (i.e., a first specialized processing block as in FIGS. 5A and 5B and a second specialized processing block as in FIGS. 5A and 5B) may collectively implement a double-precision floating-point addition as shown in FIG. 4 of first and second double-precision floating-point numbers.

The first double-precision floating-point number may include an exponent (e.g., EXPONENT_ONE) and a mantissa (e.g., MANTISSA_ONE) which may be partitioned into MSBs (e.g., MANTISSA_ONE[52:30]) and LSBs (e.g., MANTISSA_ONE[29:1]). Similarly, the second double-precision floating-point number may include an exponent (e.g., EXPONENT_TWO) and a mantissa (e.g., MANTISSA_TWO) which may be partitioned into MSBs (e.g., MANTISSA_TWO[52:30]) and LSBs (e.g., MANTISSA_TWO[29:1]).

The specialized processing block of FIG. 5A may implement either the top half of specialized processing block 410 of FIG. 4 or the top half of specialized processing block 420 of FIG. 4 and receive either the MSBs (e.g., when implementing 410) or the LSBs (e.g., when implementing 420) of the first and second mantissas (i.e., MANTISSA_ONE and MANTISSA_TWO) and the first and second exponents (i.e., EXPONENT_ONE and EXPONENT_TWO).

To simplify discussion, we refer to the MSBs and LSBs of the first and second mantissas as the first and second mantissas and specifically mention configuration differences when the specialized processing block of FIG. 5A is used as specialized processing block 410 or 420 of FIG. 4. We also refer to the top half (or the denormalization portion) shown in FIG. 5A and the bottom half (or the normalization portion) shown in FIG. 5B as the specialized processing block.

The specialized processing block may compare the first and second exponents (e.g., using subtractor 504) as well as the first and second mantissas (not shown) to determine the smaller one of the first and second double-precision floating-point numbers.

The specialized processing block may use the result of the comparison as a control signal to control multiplexers 501, 502, 505, and 506. For example, multiplexer 501 may select between the first and second mantissas the one that is associated with the greater one and multiplexer 502 the one that is associated with the smaller one of the first and second double-precision floating-point numbers.

The control signal may direct multiplexer 506 to select the first exponent if the first double-precision floating-point number is greater than the second double-precision floating-point number, and the control signal may direct multiplexer 506 to select the second exponent if the second double-precision floating-point number is greater than the first double-precision floating-point number. If desired, the specialized processing block may provide the selected exponent (e.g., EXPONENT_MID) to the normalization portion of the specialized processing block depicted in FIG. 5B.

The specialized processing block may provide the control signal (e.g., SWITCH_OUT) at output 516, for example when implementing specialized processing block 410 of FIG. 4. The specialized processing block may determine the smaller one of the first and second double-precision floating-point numbers based on the control signal SWITCH_IN in addition to the comparison of the first and second exponents and the first and second mantissas, for example when implementing specialized processing block 420 of FIG. 4. However, logical AND gate 512 together with the configurable memory element may set the output of logical AND gate 512 to zero, for example when implementing specialized processing block 410 of FIG. 4.

Multiplexer 505 may generate, together with subtractors 503 and 504, the absolute value of the difference between the first and second exponents based on the control signal by subtracting the first from the second exponent in subtractor 503, by subtracting the second from the first exponent in subtractor 504, by selecting the difference from subtractor 503 in multiplexer 505 if the second double-precision floating-point number is greater than the first double-precision floating-point number, and by selecting the difference from subtractor 504 in multiplexer 505 if the first double-precision floating-point number is greater than the second double-precision floating-point number.

The absolute value of the difference between the first and second exponents may serve as a shift value in a right shift operation in right shift circuit 507, which is sometimes also referred to as a right shifter. Circuit 509 may compare the shift value to the size of a double-precision floating-point mantissa (e.g., to check whether the shift value is greater than 55) to determine whether the shift value is saturated.

Right shift circuit 507 may shift the selected one of the first and second mantissas from multiplexer 502 a number of bits to the right that corresponds to the absolute value of the difference between the first and second exponents, thereby aligning the mantissas of the first and second double-precision floating-point numbers.

If desired, right shift circuit 507 may output a data signal, such as data signal MANTISSASHIFT_OUT at output 517, for example when implementing specialized processing block 410 of FIG. 4. If desired, data signal MANTISSASHIFT_OUT may include 29 trailing bits that are the result of the right shift operation.

The mantissa bits received as data signal MANTISSASHIFT_IN at input 515 may be concatenated with the signal from right shift circuit 507, for example when implementing specialized processing block 420 of FIG. 4. For example, logical OR gate 510 may perform a logical OR operation of the data signal MANTISSASHIFT_IN with the signal from right shift circuit 507 to perform the concatenation of the two signals. Logical AND gate 513 together with the configurable memory element may set the output of logical AND gate 513 to zero, for example when implementing specialized processing block 410 of FIG. 4.

If desired, right shift circuit 507 may output a sticky bit that may be the result of the right shift operation. Right shift circuit 511 and multiplexer 519 may ensure that the sticky bit is in the right bit position. For example, multiplexer 519 may select the output of right shifter 507, for example when implementing specialized processing block 410 of FIG. 4 and the sticky bit shifted into the LSB of the mantissa, for example when implementing specialized processing block 420 of FIG. 4.

Adder circuit 508 may add the aligned mantissas of the first and second double-precision floating-point numbers (i.e., the signal from multiplexer 501 with the signal from logical OR gate 510) and the sticky bit from multiplexer 519 to determine a partial mantissa sum (e.g., MANTISSA_MID) and a carry signal. The specialized processing block may provide the partial mantissa sum (e.g., MANTISSA_MID) to the normalization portion of the specialized processing block depicted in FIG. 5B. The specialized processing block may provide the carry signal (e.g., CARRY_OUT) at output 518, for example when implementing specialized processing block 420 of FIG. 4. In some embodiments, the specialized processing block may be arranged in a cascade chain that allows sending and receiving of signals in both directions (e.g., as shown in FIG. 4), and the specialized processing block may provide the carry signal to the same other specialized processing block from which control signals SWITCH_IN and MANTISSA_SHIFT_IN are received.

The normalization portion of the specialized processing block of FIG. 5B may receive the partial mantissa sum (e.g., MANTISSA_MID) and the selected exponent (e.g., EXPONENT_MID) from the denormalization portion of the specialized processing block shown in FIG. 5A. The specialized processing block may receive carry signal CARRY_IN at input 522 and use adder circuit 543 to add the carry signal CARRY_IN to the partial mantissa sum, thereby generating another partial mantissa.

As shown, multiplexer 544 may select between the output of adder circuit 543 (e.g., if the specialized processing block implements specialized processing block 410 of FIG. 4) and the partial mantissa sum MANTISSA_MID (e.g., if the specialized processing block implements specialized processing block 420 of FIG. 4). Multiplexer 544 may be optional, for example if the carry signal CARRY_IN is set to zero, for example when implementing specialized processing block 420 of FIG. 4.

In some embodiments, the specialized processing block may receive control signals such as signals HIGHLSB_IN, >2_IN, COUNT_IN, and USELOWCLZ_IN at inputs 528, 529, 520, and 521, respectively, for example when implementing specialized processing block 420 of FIG. 4.

The specialized processing block may use multiplexer 532 to shift the mantissa from multiplexer 544 one bit to the right based on control signals HIGHLSB_IN and >2_IN. For example, control signal >2_IN may indicate that the mantissa has a value greater than or equal to two and needs to be right shifted during normalization rather than left shifted. To perform a right shift operation, the control signal >2_IN may select the bit shifted out of the MSBs of the mantissa (i.e., signal HIGHLSB_IN) concatenated with the mantissa from multiplexer 544. Multiplexer 532 may select the mantissa from multiplexer 544 if the control signal >2_IN indicates that the mantissa has a value that is smaller than two.

Circuit 539 may determine the number of leading zeros of the partial mantissa from multiplexer 532 to determine the number of bits by which the mantissa needs to be left shifted during normalization.

When circuit 539 determines the number of leading zeros of the LSBs of the mantissa (e.g., when implementing specialized processing block 420 of FIG. 4), adder circuit 533 may need to add the number of MSBs that are computed as part of another partial mantissa using another specialized processing block (e.g., the MSBs of the mantissa computed using the specialized processing block 410 of FIG. 4). For example, if the LSBs of the mantissa include 29 bits, adder circuit 533 may add the number 23 to the number of leading zeros determined by circuit 539 to achieve a leading '1' in bit position 52 after a subsequent left shift operation.

As shown, multiplexer 534 may select between the output of adder circuit 533 and control signal COUNT_IN from input 520 based on control signal USELOWCLZ_IN from input 521. Control signal COUNT_IN may indicate the left shift amount that the specialized processing block that handles the MSBs of the mantissa (e.g., the specialized processing block 410 of FIG. 4) has used to perform normalization of the MSBs of the mantissa. Thus, control signal USELOWCLZ_IN may direct multiplexer 534 to select the control signal COUNT_IN if the specialized processing block that handles the MSBs of the mantissa (e.g., the specialized processing block 410 of FIG. 4) has detected significant bits in the MSBs of the mantissa and select the output of adder circuit 533 if the specialized processing block that handles the MSBs of the mantissa has determined that any significant bits may be found in the LSBs of the mantissas (i.e., in the specialized processing block 420 of FIG. 4).

Subtractor 535 may subtract '1' from the output of multiplexer 534, and circuit 536 may determine whether the output of multiplexer 534 is zero. For example, the output of multiplexer 534 may be zero if the mantissa is greater than two and has already been right shifted using multiplexer 532. In this example, circuit 536 may direct multiplexer 537 to select the output of subtractor 535 as an offset adjustment. Otherwise, circuit 536 may direct multiplexer 537 to select the output of multiplexer 534 as the offset adjustment.

Multiplexer 545 may select the output of circuit 539 when the specialized processing block handles the MSBs of the mantissa (e.g., when implementing specialized processing block 410 of FIG. 4), and multiplexer 545 may select the output of multiplexer 537 when the specialized processing block handles the LSBs of the mantissa (e.g., when implementing specialized processing block 420 of FIG. 4).

The mantissa from multiplexer 532 may be left-shifted in left shift circuit 540, which is sometimes also referred to as left shifter, by the number of bits from multiplexer 545 to obtain a leading '1'. The leading '1' may be eliminated because a leading '1' is implied by the IEEE754 standard. In some embodiments, the specialized processing block may produce the leading '1' as part of mantissa output MANTISSA_OUT, and downstream circuitry may eliminate the leading '1' to achieve compliance with the IEEE754 standard, if desired. As shown, mantissa MANTISSA_OUT may include 55 bits to allow for subsequent rounding operations.

During normalization, the specialized processing block may use subtractor 541 to subtract the offset adjustment (e.g., the number of bits from multiplexer 545) from the exponent (e.g., EXPONENT_MID) to account for the left shift operation in left shift circuit 540, thereby generating exponent EXPONENT_OUT. Subtractor 541 may subtract '−1' from the exponent if the mantissa is greater than two and has been right shifted using multiplexer 532.

The offset adjustment may be used by a specialized processing block that handles the LSBs of the mantissa (e.g., specialized processing block 420 of FIG. 4) to perform normalization. If desired, the specialized processing block (e.g., specialized processing block 410 of FIG. 4) may provide the number as an additional control signal (e.g., signal COUNT_OUT).

Circuit 551 may receive the output of multiplexer 545 and generate a one if the output of multiplexer 545 is a zero or a negative number, thereby indicating that left shift circuit 540 either performs a right shift operation or performs no shift operation.

If multiplexer 545 outputs a zero (i.e., the output of circuit 551 is one) and the output of multiplexer 532 is not greater than two (i.e., signal >2_OUT is zero) there may be no shift required, because all bits of the output of multiplexer 532 are zero. This may occur when computing the MSBs of the mantissa for example when implementing specialized processing block 410 of FIG. 4. In other words, any significant bits may be found in the LSBs of the mantissas that may be generated in an additional specialized processing block (e.g., specialized processing block 420 of FIG. 4).

The specialized processing block that handles the MSBs of the mantissa may generate a control signal (e.g., signal USELOWCLZ_OUT) using circuit 551 and logical AND gate 553 with the signal from multiplexer 532 being inverted to indicate that an additional specialized processing block (e.g., specialized processing block 420 of FIG. 4) may need to determine the number of bits to be left shifted to achieve normalization of the mantissa. Alternatively, the logical AND gate 553 with the inverted signal from multiplexer 532 may be replaced by a logical exclusive OR gate with a non-inverted signal from multiplexer 532. If desired, the specialized processing block may provide such a control signal (e.g., signal USELOWCLZ_OUT) at an output.

If desired, additional circuitry may perform the remaining computation steps to determine the mantissa result and the exponent result of the double-precision floating-point addition of first and second double-precision floating-point numbers. For example, the mantissa result may be determined by performing a logical OR operation between the 23 LSBs of the MSBs of MANTISSA_OUT (e.g., generated by specialized processing block 410 of FIG. 4) and the 23 MSBs of the LSBs of MANTISSA OUT (e.g., generated by specialized processing block 420 of FIG. 4) and concatenating the output of the logical OR operation with the 29 LSBs of MANTISSA_OUT (e.g., generated by specialized processing block 420 of FIG. 4). In some embodiments, circuitry outside the specialized processing blocks of FIGS. 3 and 4 may implement the additional circuitry.

The exponent result of the double-precision floating-point addition may be generated by the specialized processing block that generates the LSB of the mantissa (e.g., EXPONENT_OUT from specialized processing block 420 of FIG. 4) if control signal USELOWCLZ_IN is logical one and by the specialized processing block that generates the MSB of the mantissa (e.g., EXPONENT_OUT from specialized processing block 410 of FIG. 4) otherwise.

It will be recognized by one skilled in the art, that as shown, the specialized processing block of FIGS. 5A and 5B may be used in implementing specialized processing blocks 310, 320, 330, and 340 of FIG. 3 and/or specialized processing blocks 410 and 420 of FIG. 4.

Figure 6A:
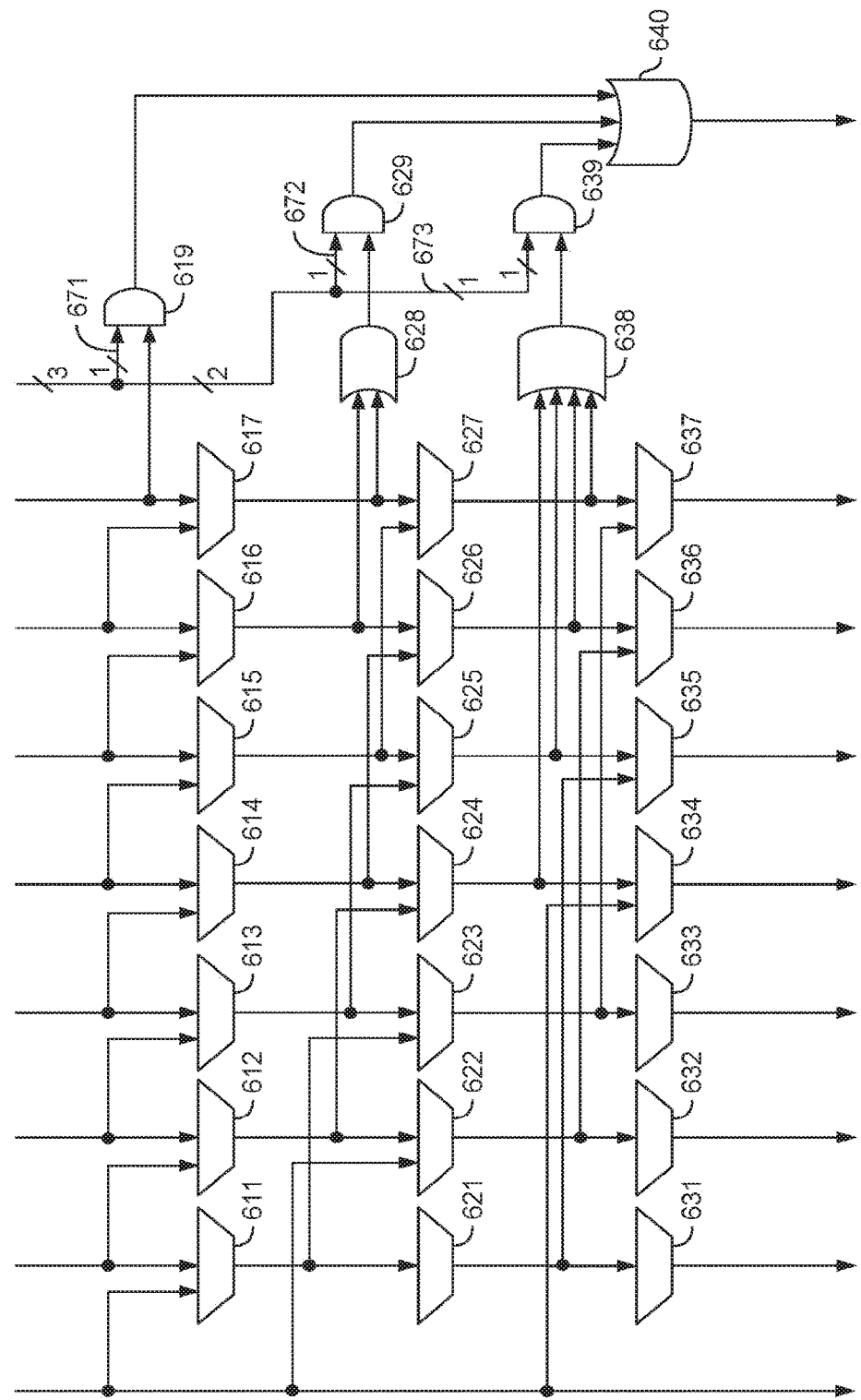
FIG. 6A is a diagram of an illustrative shifter circuit for computing a sticky bit in accordance with an embodiment.
Figure 6B:
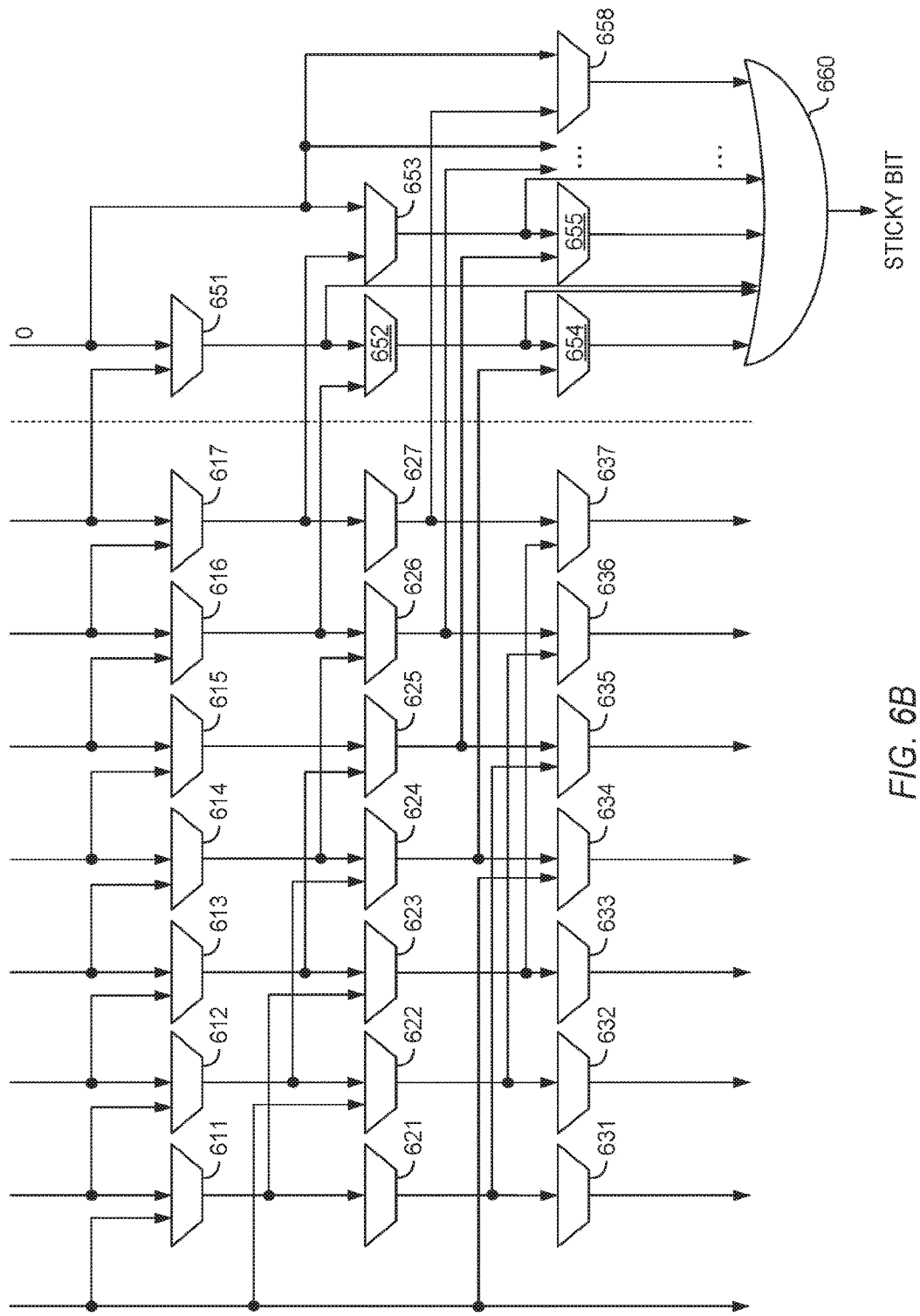
FIG. 6B is a diagram of another illustrative shifter circuit for computing a sticky bit in accordance with an embodiment.

FIGS. 2A, 2B, and 5A show right shifter circuits that shift a mantissa or a portion of a mantissa a predetermined number of bits to the right and determine a sticky bit. FIGS. 6A and 6B show illustrative diagrams of such right shifter circuits in accordance with an embodiment.

As shown in FIG. 6A, the right shifter circuit may include multiplexers 611-617, 621-627, and 631-637 to perform the right shift operation in three stages, and logical AND gates 619, 629, and 639, and logical OR gates 628, 638, and 640 to generate the sticky bit. The right shifter circuit may perform the right shift operation in stages. Every stage may be controlled by a single bit that also controls the sticky shift computation at that stage. For example, the first, second, and third stages may be controlled by bits 671, 672, and 673, respectively.

For example, if bit 671 is set to one, multiplexers 611-617 may select the respective left input, thereby shifting all incoming bits by one bit to the right. Similarly, if bit 672 and 673 are set to one, multiplexers 621-627 and 631-637 may select the left input, thereby right shifting the bits by 2 and 4 bit positions, respectively.

The sticky bit may be computed as the logical OR of all bits that are shifted to the right beyond the precision of the mantissa. Logical OR gates 628 and 638 may perform a first logical OR operation at the respective second and third stages. The first stage has only one bit and a logical OR gate may be omitted.

Logical AND gates 619, 629, and 639 may propagate the respective logical OR of each stage to logical OR gate 640 if the respective stage performs a right shift operation. Logical OR gate 640 may perform a logical OR operation of all right shifted mantissa bits by performing a logical OR operation of the signals from logical AND gates from each stage (e.g., logical AND gates 619, 629, and/or 639) that performs a right shift operation.

The right shift circuit of FIG. 6B is similar to the right shift circuit of FIG. 6A and mainly differs in the way the sticky bit is generated. The right shift circuit of FIG. 6B may include multiplexers 611-617, 621-627, and 631-637 to perform the right shift operation in three stages, and multiplexers 651, 652, 653, 654, 655, and 658, and logical OR gate 660 to generate the sticky bit. The right shifter circuit may perform the right shift operation in stages. Every stage may be controlled by a single bit that also controls the sticky shift computation at that stage.

For example, if the control bit at a given stage is set to one, the multiplexers (e.g., multiplexers 611-617) may select the left input, thereby shifting all incoming bits by one bit in the first stage, by two bits in the second stage, and by four bits in the third stage to the right.

The sticky bit may be computed as the logical OR of all bits that are shifted to the right beyond the precision of the mantissa. Multiplexers 651, 652, 653, 654, 655, and 658 at the respective stages may be controlled by the same control bit as the right shift operation. Thus, multiplexer 651 may select the left input (i.e., the bits shifted out of if the control bit directs a right shift operation in the first stage and the right input (i.e., logic '0') if the first stage does not perform a right shift operation. Logical OR gate 660 may perform a logical OR operation of all right shifted mantissa bits by performing a logical OR operation of the outputs of multiplexers 651, 652, 653, 654, 655, and 658.

Figure 7:
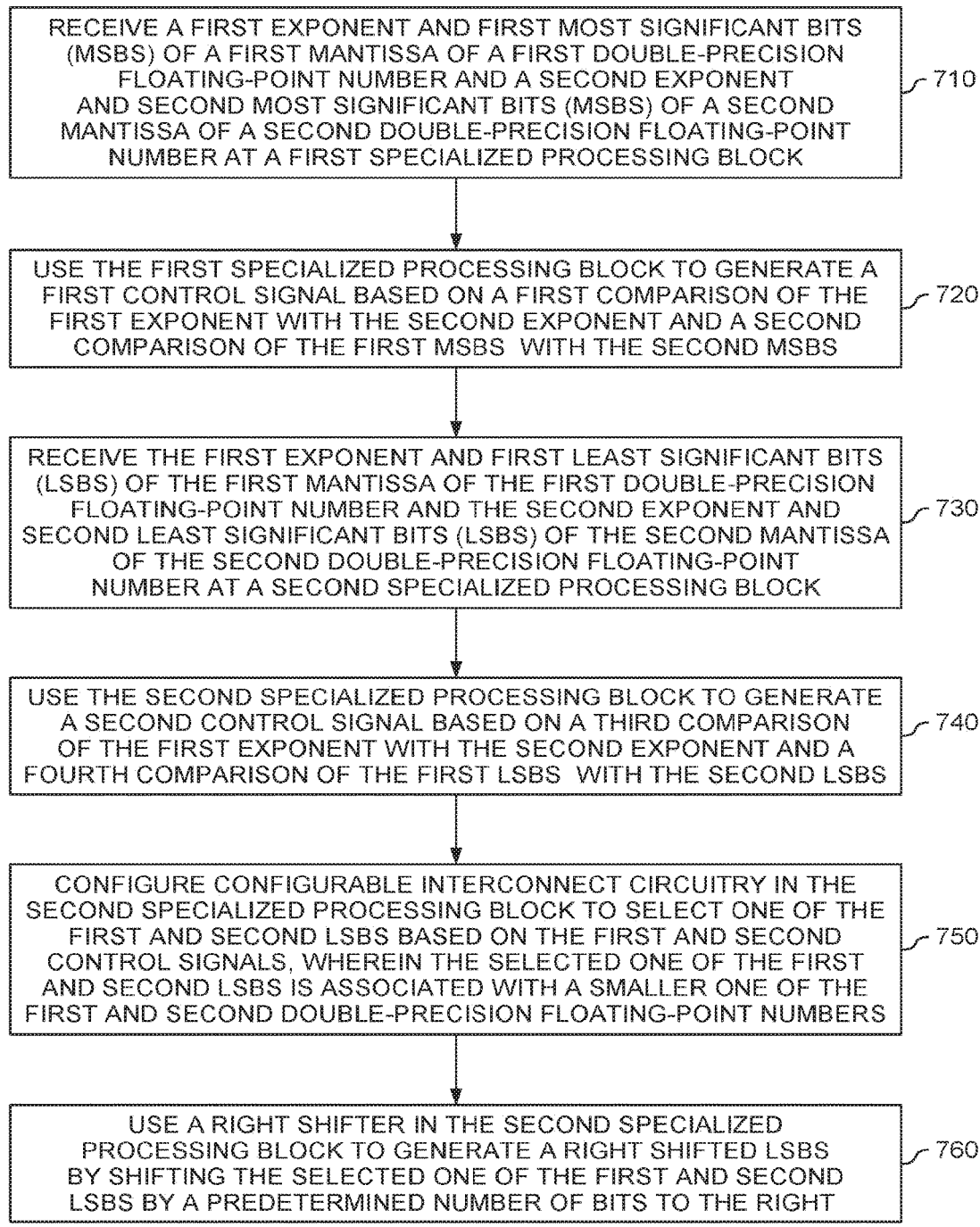
FIG. 7 is a diagram of a flow chart showing illustrative steps for operating first and second specialized processing blocks that are arranged in a cascade chain in accordance with an embodiment.

FIG. 7 is a diagram of a flow chart showing illustrative steps for operating a specialized processing block in accordance with an embodiment.

During operation 710, the specialized processing block may receive a first exponent and first most significant bits (MSBs) of a first mantissa of a first double-precision floating-point number and a second exponent and second most significant bits (MSBs) of a second mantissa of a second double-precision floating-point number at a first specialized processing block.

For example, the specialized processing block of FIG. 2A may receive exponent EXPONENT_ONE and the MSBs of mantissa MANTISSA_ONE (e.g., MANTISSA_ONE[52:30]) of a first double-precision floating-point number and exponent EXPONENT_TWO and the MSBs of mantissa MANTISSA_TWO (e.g., MANTISSA_TWO[52:30]) of a second double-precision floating-point number.

During operation 720, the specialized processing block may generate a first control signal based on a first comparison of the first exponent with the second exponent and a second comparison of the first MSBs with the second MSBs. For example, the specialized processing block of FIG. 2A may compare the exponents EXPONENT_ONE and EXPONENT_TWO (e.g., using subtractor 204) and the MSBs of MANTISSA_ONE and MANTISSA_TWO to generate control signal SWITCH_OUT.

During operation 730, the specialized processing block may receive the first exponent and first least significant bits (LSBs) of the first mantissa of the first double-precision floating-point number and the second exponent and second least significant bits (LSBs) of the second mantissa of the second double-precision floating-point number at the second specialized processing block.

For example, the specialized processing block of FIG. 2B may receive exponent EXPONENT_ONE and the LSBs of mantissa MANTISSA_ONE (e.g., MANTISSA_ONE[29:1]) of the first double-precision floating-point number and exponent EXPONENT_TWO and the LSBs of mantissa MANTISSA_TWO (e.g., MANTISSA_TWO[29:1]) of the second double-precision floating-point number.

During operation 740, the specialized processing block may generate a second control signal based on a third comparison of the first exponent with the second exponent and a fourth comparison of the first LSBs with the second LSBs. For example, the specialized processing block of FIG. 2B may compare the exponents EXPONENT_ONE and EXPONENT_TWO (e.g., using subtractor 204) and the LSBs of MANTISSA_ONE and MANTISSA_TWO.

During operation 750, the second specialized processing block may configure configurable interconnect circuitry to select one of the first and second LSBs based on the first and second control signals, wherein the selected one of the first and second LSBs is associated with a smaller one of the first and second double-precision floating-point numbers.

For example, multiplexer 202 in the specialized processing block of FIG. 2B may select one of the LSBs of MANTISSA_ONE and MANTISSA_TWO based on the control signal SWITCH_IN from input 212 and the comparison of the exponents EXPONENT_ONE and EXPONENT_TWO (e.g., using subtractor 204) and the LSBs of MANTISSA_ONE and MANTISSA_TWO.

During operation 760, the second specialized processing block may use a right shifter to generate a right shifted LSB signal by shifting the selected one of the first and second LSBs by a predetermined number of bits to the right. For example, the specialized processing block of FIG. 2B may use right shift circuit 207 to shift the output of multiplexer 202 a predetermined number of bits to the right, whereby the predetermined number of bits may correspond to the absolute value of the difference between the two exponents as computed using subtractors 203, 204, and multiplexer 205.

Figure 8:
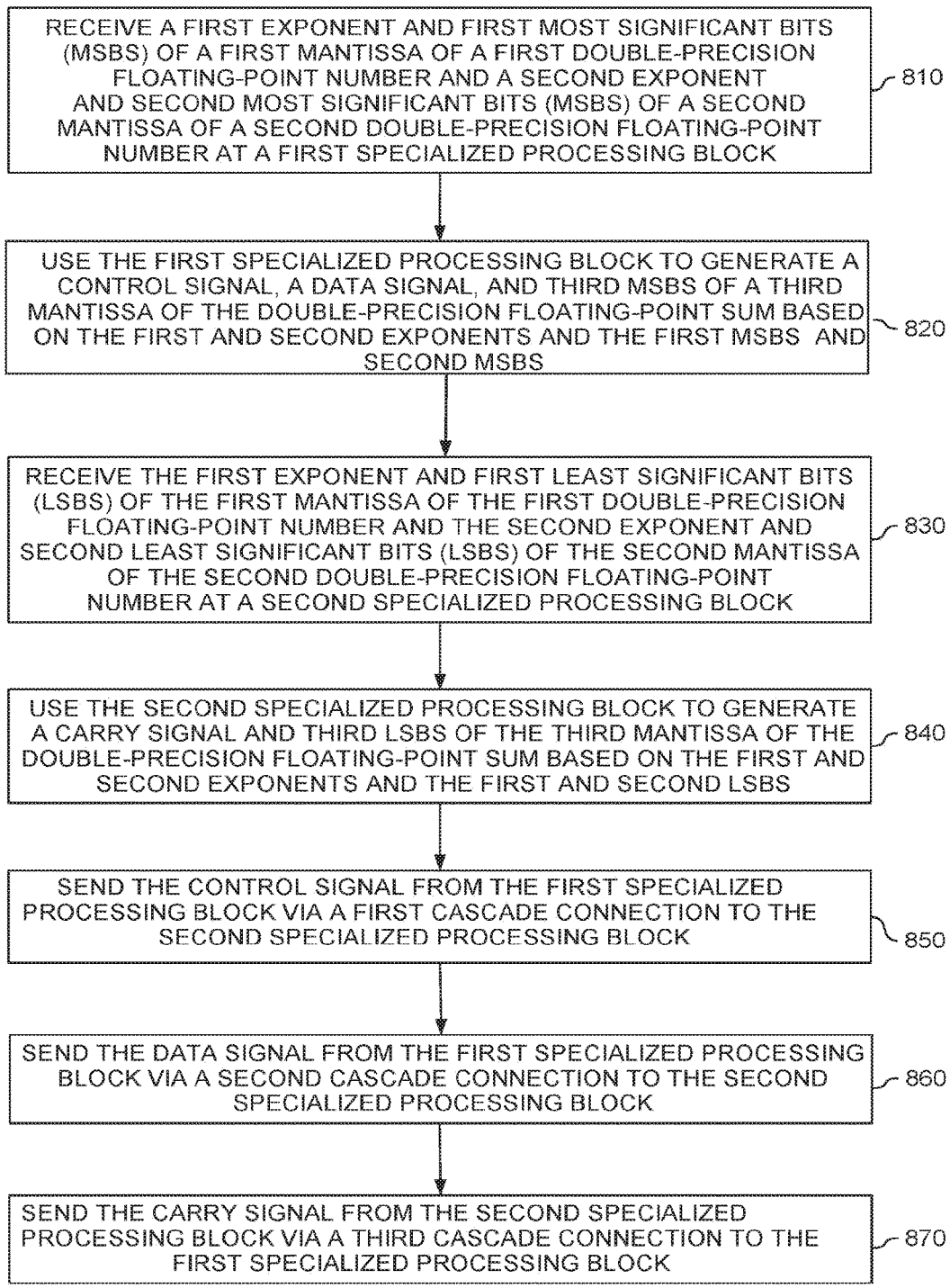
FIG. 8 is a diagram of a flow chart showing illustrative steps for operating first and second specialized processing blocks that are arranged in a bidirectional cascade chain in accordance with an embodiment.

FIG. 8 is a diagram of a flow chart showing illustrative steps for operating first and second specialized processing blocks that are arranged in a bidirectional cascade chain in accordance with an embodiment.

During operation 810, the first specialized processing blocks may receive a first exponent and first most significant bits (MSBs) of a first mantissa of a first double-precision floating-point number and a second exponent and second MSBs of a second mantissa of a second double-precision floating-point number.

For example, specialized processing block 410 of FIG. 4 may receive exponent EXPONENT_ONE and the MSBs of mantissa MANTISSA_ONE (e.g., MANTISSA_ONE[52:30]) of a first double-precision floating-point number and exponent EXPONENT_TWO and the MSBs of mantissa MANTISSA_TWO (e.g., MANTISSA_TWO[52:30]) of a second double-precision floating-point number.

During operation 820, the specialized processing block may generate a control signal, a data signal, and third MSBs of a third mantissa of the double-precision floating-point sum based on the first and second exponents and the first and second MSBs.

For example, specialized processing block 410 of FIG. 4 may generate control signal SHIFT, data signal MANTISSASHIFT, and MSBs M_CC of the double-precision floating-point sum based on exponents EXPONENT_ONE, EXPONENT_TWO and first and second MSBs MANTISSA_ONE[52:30] and MANTISSA_TWO[52:30].

During operation 830, the second specialized processing block may receive the first exponent and first least significant bits (LSBs) of the first mantissa of the first double-precision floating-point number and the second exponent and second LSBs of the second mantissa of the second double-precision floating-point number.

For example, specialized processing block 420 of FIG. 4 may receive exponent EXPONENT_ONE and the LSBs of mantissa MANTISSA_ONE (e.g., MANTISSA_ONE[29:31]) of the first double-precision floating-point number and exponent EXPONENT_TWO and the LSBs of mantissa MANTISSA_TWO (e.g., MANTISSA_TWO[29:1]) of the second double-precision floating-point number.

During operation 840, the second specialized processing block may generate a carry signal and third LSBs of the third mantissa of the double-precision floating-point sum based on the first and second exponents and the first and second LSBs.

For example, specialized processing block 420 of FIG. 4 may generate carry signal CARRY and LSBs M_DD of the double-precision floating-point sum based on exponents EXPONENT_ONE, EXPONENT_TWO and first and second LSBs MANTISSA_ONE[29:1] and MANTISSA_TWO[29:1].

During operation 850, the first specialized processing block may send the control signal via a first cascade connection to the second specialized processing block.

For example, specialized processing block 410 of FIG. 4 may send control signal SHIFT via a first cascade connection to specialized processing block 420.

During operation 860, the first specialized processing block may send the data signal via a second cascade connection to the second specialized processing block.

For example, specialized processing block 410 of FIG. 4 may send data signal MANTISSASHIFT via a second cascade connection to specialized processing block 420.

During operation 870, the second specialized processing block may send the carry signal via a third cascade connection to the first specialized processing block.

For example, specialized processing block 420 of FIG. 4 may send carry signal CARRY via a third cascade connection to specialized processing block 410.

The method and apparatus described herein may be incorporated into any suitable circuit or system of circuits. For example, the method and apparatus may be incorporated into numerous types of devices such as microprocessors or other integrated circuits. Exemplary integrated circuits include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), coarse-grained reconfigurable architectures (CGRAs), digital signal processing (DSP) circuits, application specific standard products (ASSPs), application specific integrated circuits (ASICs), just to name a few.

The integrated circuit described herein may be part of a data processing system that includes one or more of the following components: a processor; memory; I/O circuitry; and peripheral devices. The data processing system can be used in a wide variety of applications, such as computer networking, data networking, instrumentation, video processing, digital signal processing, or any suitable other application where the advantage of using circuitry that efficiently performs both, single-precision floating-point arithmetic operations and double-precision floating-point arithmetic operations, is desirable.

The integrated circuit may be configured to perform a variety of different logic functions. For example, the integrated circuit may be configured as a processor or controller that works in cooperation with a system processor. The integrated circuit may also be used as an arbiter for arbitrating access to a shared resource in the data processing system. In yet another example, the integrated circuit may be configured as an interface between a processor and one of the other components in the system. In one embodiment, the integrated circuit may be one of the families of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing.

The foregoing is merely illustrative of the principles of the embodiments and various modifications can be made by those skilled in the art without departing from the scope and spirit of the embodiments disclosed herein. The foregoing embodiments may be implemented individually or in any combination. The above described embodiments are presented for purposes of illustration and not of limitation, and the present invention is limited only by the claims that follow.

What is claimed is:

1. A system for a double-precision floating-point sum of two double-precision floating-point numbers, comprising:
   a first processing circuit that receives a first subset of each of the two double-precision floating-point numbers and generates a control signal, a data signal indicating shifted values of one or both of the two double-precision floating-point numbers, and a first portion of the double-precision floating-point sum based at least in part on the first subset of each of the two double-precision floating-point numbers, wherein the first subset of each of the two double-precision floating-point numbers comprises:
      a first portion of a first mantissa of a first double-precision floating-point number of the two double-precision floating-point numbers;
      a second portion of a second mantissa of a second double-precision floating-point number of the two double-precision floating-point numbers, wherein the first portion of the first mantissa and the first portion of the second mantissa have corresponding locations within their respective floating-point numbers;
      a first exponent of the first double-precision floating-point number of the two double-precision floating-point numbers; and
      a second exponent of the second double-precision floating-point number of the two double-precision floating-point numbers;
   a second processing circuit that receives a second subset of each of the two double-precision floating-point numbers and generates a carry signal and a second portion of the double-precision floating-point sum based at least in part on the second subset of each of the two double-precision floating-point numbers, wherein the second subset of each of the two double-precision floating-point numbers comprises:
      a second portion of the first mantissa;
      a second portion of a second mantissa;
      the first exponent; and
      the second exponent; and
   a bidirectional cascade chain that couples to the first and second processing circuits and that:
      conveys the control signal from the first processing circuit to the second processing circuit,
      conveys the data signal from the first processing circuit to the second processing circuit, and
      conveys the carry signal from the second processing circuit to the first processing circuit.

2. The system of claim 1, wherein the first portion of the first mantissa comprises most significant bits of the first mantissa, and the first portion of the second mantissa comprises most significant bits of the second mantissa.

3. The system of claim 2, wherein a first number of the most significant bits in the first portion of the first mantissa is the same as a second number of the most significant bits in the first portion of the second mantissa.

4. The system of claim 1, wherein the second portion of the first mantissa comprises least significant bits of the first mantissa, and the second portion of the second mantissa comprises least significant bits of the second mantissa.

5. The system of claim 4, wherein a first number of the least significant bits in the second portion of the first mantissa is the same as a second number of least significant bits in the second portion of the second mantissa.

6. The system of claim 1, wherein the first processing circuit comprises:
   configurable interconnect circuitry that selects the first double-precision floating-point number of the two double-precision floating-point numbers based at least in part on the control signal, wherein the control signal indicates that the first double-precision floating-point number is smaller than the second double-precision floating-point number of the two double-precision floating-point numbers; and
   a right shifter that generates a right shifted signal by shifting a portion of the selected first double-precision floating-point number by a predetermined number of bits to the right.

7. The system of claim 6, wherein the first processing circuit comprises an adder circuit that adds the carry signal and the right shifted signal to a corresponding portion of the second double-precision floating-point number, and wherein the adder circuit generates a partial mantissa signal.

8. The system of claim 7, wherein the first processing circuit comprises a normalization circuit that shifts the partial mantissa signal an additional predetermined number of bits to the left to generate a normalized mantissa.

9. A method for operating first and second specialized processing blocks that are arranged in a bidirectional cascade chain to generate a double-precision floating-point sum, comprising:
   receiving, at a first processing circuit, a first subset of a first double-precision floating-point number and a first subset of a second double-precision floating-point number, wherein the first subsets of the first and second double-precision floating-point numbers comprises:
      a first portion of a first mantissa of the first double-precision floating-point number;
      a second portion of a second mantissa of the second double-precision floating-point number, wherein the first portion of the first mantissa and the first portion of the second mantissa have corresponding locations within their respective floating-point numbers;
      a first exponent of the first double-precision floating-point number; and
      a second exponent of the second double-precision floating-point number;
   determining, using the first subset of the first double-precision floating-point number and the first subset of the second double-precision floating-point number whether the first double-precision floating-point number or the second double-precision floating-point number is larger;

generating, using the first processing circuit, a control signal indicating that the first double-precision floating-point number is larger than the second double-precision floating-point number;

generating, using the first processing circuit, a data signal indicating shifted values of the first or second double-precision floating-point number, and a first partial sum that is based at least in part on the first subset of the first double-precision floating-point number and the first subset of the second double-precision floating-point number;

receiving a second subset of the first double-precision floating-point number and a second subset of the second double-precision floating-point number at a second processing circuit, wherein the second subsets of the first and second double-precision floating-point numbers comprises:
a second portion of the first mantissa;
a second portion of a second mantissa;
the first exponent; and
the second exponent; and generating, using the second processing circuit, a carry signal and a second partial sum that is based at least in part on the second subset of the first double-precision floating-point number and the second subset of the second double-precision floating-point number.

10. The method of claim 9, comprising sending the control signal from the first processing circuit to the second processing circuit.

11. The method of claim 9, comprising sending the data signal from the first processing circuit to the second processing circuit.

12. The method of claim 9, comprising sending the carry signal from the second processing circuit to the first processing circuit.

13. An integrated circuit that generates a double-precision floating-point sum of first and second double-precision floating-point numbers, comprising:
a cascade chain that interconnects a plurality of processing circuitries; and
the plurality of processing circuitries, wherein a first processing circuitry of the plurality of processing circuitries receives a first portion of the first double-precision floating-point number and a first portion of the second double-precision floating-point number, wherein the first processing circuitry is selectively operated in a first mode or second mode, wherein the first mode comprises the first processing circuitry:
receiving a first carry signal over the cascade chain;
generating a first control signal indicating whether the first double-precision floating-point number or the second double-precision floating-point number is larger;
generating a first data signal indicating shifted values of the first or second double-precision floating-point numbers; and
generating most significant bits (MSBs) of the double-precision floating-point sum based at least in part on the first carry signal, and
transmitting the first control signal and the first data signal; and
the second mode comprises the first processing circuitry:
receiving a second control signal from a second processing circuitry of the plurality of processing circuitries;
generating a second carry signal; and
generating least significant bits (LSBs) of the double-precision floating-point sum based at least in part on the second control signal.

14. The integrated circuit of claim 13, wherein the cascade chain comprises a bidirectional cascade chain that comprises:
at least one first cascade connection in a first direction from the first processing circuitry to the second processing circuitry; and
at least one second cascade connection in a second direction from the second processing circuitry to the first processing circuitry.

15. The integrated circuit of claim 13, wherein the second mode comprises the second processing circuitry:
generating a second data signal based on the second carry signal.

16. The integrated circuit of claim 13, wherein, in the first mode of the first processing circuitry, the first portion comprises:
a first exponent corresponding to the first double-precision floating-point number;
a second exponent corresponding to the second double-precision floating-point number;
a first MSB portion of a mantissa of the first double-precision floating-point number; and
a second MSB portion of a mantissa of the second double-precision floating-point number.

17. The integrated circuit of claim 14, wherein the second processing circuitry receives:
a first exponent corresponding to the first double-precision floating-point number;
a second exponent corresponding to the second double-precision floating-point number;
a first LSB portion of a mantissa of the first double-precision floating-point number; and
a second LSB portion of a mantissa of the second double-precision floating-point number.

18. The integrated circuit of claim 13, wherein, in the second mode of the first processing circuitry, the first portion comprises:
a first exponent corresponding to the first double-precision floating-point number;
a second exponent corresponding to the second double-precision floating-point number;
a first LSB portion of a mantissa of the first double-precision floating-point number; and
a second LSB portion of a mantissa of the second double-precision floating-point number.

* * * * *